(12) United States Patent
Tamblyn et al.

(10) Patent No.: US 11,755,978 B2
(45) Date of Patent: Sep. 12, 2023

(54) SYSTEM FOR PROVIDING DYNAMIC RECOMMENDATIONS BASED ON INTERACTIONS IN RETAIL STORES

(71) Applicant: Genesys Telecommunications Laboratories, Inc., Daly, CA (US)

(72) Inventors: Eric Tamblyn, Murphy, TX (US); Simon Wright, Sheffield (GB); Yochai Konig, San Francisco, CA (US); Christopher Connolly, New York City, NY (US); Chad David Hendren, Elkhorn, NE (US); Arnaud Lejeune, Chicago, IL (US)

(*) Notice: Subject to any disclaimer, the term of this patent is extended or adjusted under 35 U.S.C. 154(b) by 0 days.

(21) Appl. No.: 16/139,662

(22) Filed: Sep. 24, 2018

(65) Prior Publication Data

US 2019/0026676 A1    Jan. 24, 2019

Related U.S. Application Data

(62) Division of application No. 14/451,322, filed on Aug. 4, 2014, now Pat. No. 10,121,116.

(Continued)

(51) Int. Cl.
*G06Q 30/00* (2023.01)
*G06Q 10/0639* (2023.01)
(Continued)

(52) U.S. Cl.
CPC ... *G06Q 10/06393* (2013.01); *G06Q 10/0639* (2013.01); *G06Q 30/0201* (2013.01);
(Continued)

(58) Field of Classification Search
CPC ..... G06Q 30/0601–0645; G06Q 30/08; G06Q 10/06393; G06Q 10/0639; G06Q 30/0201; H04M 3/5175; H04M 3/5191
(Continued)

(56) References Cited

U.S. PATENT DOCUMENTS 7,487,094 B1   2/2009   Konig et al.
8,687,776 B1   4/2014   Reynolds et al.
(Continued)

FOREIGN PATENT DOCUMENTS

JP   2003-242336   8/2003
KR   10-2005-0098202   10/2005

OTHER PUBLICATIONS

Davenpoort, et al., "Know What Your Customers Want Before They Do", Dec. 2011, Harvard Business Review, accessed at [https://hbr.org/2011/12/know-what-your-customers-want-before-they-do] (Year: 2011).*

(Continued)

*Primary Examiner* — Michael Misiaszek
*Assistant Examiner* — Lindsey B Smith

(57) ABSTRACT

An end-user device operable in a retail store records a voice conversation held in the retail store. The recording is transmitted to a server for comparing it to recordings of other conversations from a plurality of other retail stores. The server makes a recommendation based on the comparing. Embodiments of the invention are also directed to an analytics system that collects real-time metrics data for various virtual or physical retail stores associated with a plurality of contact centers. The system performs real-time analytics of the collected metrics data for identifying a product or service. The processor modifies, based on the real-time analytics, a prior service or product to be offered by a particular retail store, with the identified service or product. The processor pushes the modified service or product for display on the end-user device use in the particular retail store.

5 Claims, 22 Drawing Sheets

Related U.S. Application Data

(60) Provisional application No. 62/003,508, filed on May 27, 2014.

(51) Int. Cl.
*G06Q 30/0201* (2023.01)
*G06Q 30/0601* (2023.01)
*H04M 3/51* (2006.01)

(52) U.S. Cl.
CPC ...... G06Q 30/0631 (2013.01); H04M 3/5175 (2013.01); H04M 3/5191 (2013.01); *G06Q 30/0601* (2013.01); *G06Q 30/0613* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 8,712,857 B1* | 4/2014 | Adornato | G06Q 30/0207 705/26.7 |
| 9,210,600 B1 | 12/2015 | Jadunandan et al. | |
| 2002/0087385 A1 | 7/2002 | Vincent | |
| 2003/0018522 A1 | 1/2003 | Denimarck et al. | |
| 2004/0083113 A1 | 4/2004 | Cao et al. | |
| 2005/0013428 A1* | 1/2005 | Walters | H04M 3/2218 379/266.08 |
| 2008/0091466 A1 | 4/2008 | Butler et al. | |
| 2008/0112557 A1* | 5/2008 | Ricketts | G06Q 10/06 379/265.03 |
| 2008/0152116 A1 | 6/2008 | Sylvain | |
| 2009/0197616 A1 | 8/2009 | Lewis et al. | |
| 2010/0274637 A1 | 10/2010 | Li et al. | |
| 2010/0318412 A1 | 12/2010 | Karypis et al. | |
| 2011/0010173 A1* | 1/2011 | Scott | G10L 21/10 704/235 |
| 2011/0082737 A1 | 4/2011 | Crowe et al. | |
| 2011/0093344 A1* | 4/2011 | Burke | G06Q 30/06 705/14.65 |
| 2011/0178828 A1 | 7/2011 | Hung et al. | |
| 2011/0202472 A1* | 8/2011 | Wan | G06Q 10/0639 705/345 |
| 2012/0089444 A1 | 4/2012 | Martin | |
| 2012/0166235 A1 | 6/2012 | Klemm | |
| 2012/0215578 A1* | 8/2012 | Swierz, III | G06Q 50/205 705/7.14 |
| 2012/0324375 A1 | 12/2012 | Mathews | |
| 2013/0104030 A1 | 4/2013 | Parreira | |
| 2013/0124262 A1 | 5/2013 | Anchala | |
| 2013/0325891 A1 | 12/2013 | Masood | |
| 2013/0336465 A1* | 12/2013 | Dheap | H04M 3/5166 379/88.01 |
| 2014/0088952 A1 | 3/2014 | Fife et al. | |
| 2014/0140497 A1 | 5/2014 | Ripa et al. | |
| 2014/0249957 A1 | 9/2014 | Saha et al. | |
| 2014/0316848 A1 | 10/2014 | Fuchs et al. | |
| 2014/0337151 A1* | 11/2014 | Crutchfield | G06F 1/1601 705/17 |
| 2014/0358666 A1* | 12/2014 | Baghaie | G06Q 30/0267 705/14.41 |
| 2015/0324727 A1* | 11/2015 | Erhart | G06Q 10/063114 705/7.15 |
| 2015/0332350 A1 | 11/2015 | Gauss et al. | |
| 2015/0347951 A1 | 12/2015 | Tamblyn et al. | |
| 2015/0350435 A1 | 12/2015 | Connolly et al. | |

OTHER PUBLICATIONS

K. Kirchhoff et al., "Factored Language Models Tutorial", UWEE Technical Report No. UWEETR-2008-0004, Feb. 2008, 39 pages, Department of Electrical Engineering, University of Washington.

R.J. Lewis, An Introduction to Classification and Regression Tree (CART) Analysis 11, Presented at the 2000 Annual Meeting of the Society for Academic Emergency Medicine in San Francisco, California, May 22-25, 2000, 14 pages, San Francisco, California.

International Search Report and Written Opinion for International Patent Application No. PCT/US2015/032655, dated Sep. 30, 2015, 17 pages.

CenterForce Technologies and Benchmark Portal.com Team to Offer Comprehensive Call Center Benchmarking Solution, PR Newswire; New York, New York, Jan. 23, 2001; 7 pages.

Extended European Search Report for Application No. 15799235.5, dated Nov. 16, 2017, 8 pages.

Read, Brendan B.; Call center checkup; Call Center Magazine, Jun. 2003, 16:6; ProQuest Central, p. 26.

Datoo, Siraj, How Tracking customers in-store will soon be the norm, Jan. 10, 2014, The Guardian, accessed on Jun. 20, 2018, accessed at [https://www.theguardian.com/technology/datablog/2014/jan/10/how-tracki ng-customers-in-store-will-soon-be-the-norm]. (Year: 2014).

Kilborn, Peter T., In a Growing Number of Stores, Hidden Security Microphones are Listening, May 28, 1994, New York Times, accessed on Jun. 20, 2018, accessed at [https://www.nytimes.com/1994/05/28/us/in-a-growing-number-of-stores-hidden-security-microphones-are-listening.html]. (Year: 1994).

* cited by examiner

SYSTEM FOR PROVIDING DYNAMIC RECOMMENDATIONS BASED ON INTERACTIONS IN RETAIL STORES

CROSS-REFERENCE TO RELATED APPLICATIONS

This application claims the benefit of U.S. patent application Ser. No. 14/451,322, filed Aug. 4, 2014, which in turn claims the benefit of U.S. Provisional Application Ser. No. 62/003,508, filed May 27, 2014, the content of which is incorporated herein by reference.

This application is also related to "MULTI-TENANT BASED ANALYTICS FOR CONTACT CENTERS," application Ser. No. 14/451,310, filed Aug. 4, 2014, and "SYSTEM AND METHOD FOR BRIDGING ONLINE CUSTOMER EXPERIENCE", application Ser. No. 14/451,338, filed Aug. 4, 2014, the contents of both of which are incorporated herein by reference.

BACKGROUND

Contact centers often want to evaluate their performance against industry standards and benchmarks. Such benchmark information, however, is generally published as literature and not available on a real-time basis. It is desirable to have the benchmark information available in real-time, or substantially in real-time, to allow companies to quickly understand their performance and react based on the information before the information becomes stale. For example, customer experience (CX) strategies may be modified in real-time based on what other companies are doing.

CX strategies are often aimed in achieving certain Key Performance Indicators (KPI's) for the company, such as, for example:

(1) Customer Satisfaction (CSAT)—a measure of the degree to which the contact center service meets the customer's expectations.

(2) Revenue or Sales Conversions—the amount of sales that contact centers generate per time unit via direct sale or up sell/cross sell.

(3) Cost—the cost of labor and equipment of operating contact center per time unit.

(4) Retention or Churn Reduction—from all the customers that want to close their accounts, which portion the contact center is able to "save".

These are high-level KPI's that may be the outcome of many factors such as, for example, staffing and training levels, specifics and frequencies of sales efforts, routing strategies, contact center policies, and many more. In a typical contact center, trial and error is generally used where certain factors under the control of the contact is center are set to particular values, and outcome of the KPIs are measured over time. Thus, there is generally no way of knowing how a change in one of these factors will affect a KPI without actually going through the change and observing the outcome. For instance, adding more agents might increase CSAT (e.g. by reducing wait time and adding more adequate agents to answer callers), but it is generally not known in advance as to how much CSAT will increase, and what the optimal set up is. Such determinations cannot generally be made in a quantified fashion with today's methods.

SUMMARY

Embodiments of the present invention are directed to an end-user device operable in a retail store. The end-user device includes a microphone, processor, and memory. The memory stores instructions that, when executed by the processor, cause the processor to perform the following actions. The processor invokes the microphone for recording a voice conversation held in the retail store. The processor transmits the recording to a server over a data communications network. The server is configured to receive recordings of other conversations from a plurality of other retail stores, and perform real-time analysis of the recordings for comparing the voice conversation in the retail store against other conversations in the other retail stores. The processor receives a recommendation from the server based on the comparing.

According to one embodiment, the memory hosts an application invoked by a store representative in the particular retail store for recording the voice conversation. According to this embodiment, the application is configured to display the recommendation from the server.

According to one embodiment, the voice conversation is a coaching session between a store representative and a store manager, and the recommendation is a modified coaching script.

According to one embodiment, the conversation is between a customer and a store representative, and the recommendation is for a particular product or service.

According to one embodiment, the server is configured to correlate the recording of the voice conversation in the retail store, to an interaction with the customer and an agent of a contact center associated with the retail store.

According to one embodiment, the processor receives information on a customer visiting the retail store, captures interaction data occurring in the retail store, and transmits the interaction data to the server along with the information on the customer for storing in an interaction database in correlation with other interactions of the customer. The other interactions are between the customer and an agent of a contact center associated with the retail store.

Embodiments of the present invention are also directed to a multi-tenant analytics system that includes a data store, a processor coupled to the data store, and a memory. The memory stores instructions that, when executed by the processor, cause the processor to take the following actions. The processor collects from a plurality of source devices over a data communication network, real-time metrics data for a plurality of virtual or physical retail stores associated with a plurality of contact centers. The processor stores the collected real-time metrics data in the data store, and performs real-time analytics of the collected metrics data for identifying a product or service. The processor modifies, based on the real-time analytics, a prior service or product to be offered by a particular retail store of the physical retail stores, with the identified service or product. The processor pushes the modified service or product for display on an electronic device at the particular retail store.

According to one embodiment, the electronic device is configured to host an application invoked by a store representative in the particular retail store.

According to one embodiment, the real-time metrics data includes at least one of interactions at the retail stores, customer satisfaction data, sales data, or retail store workforce data.

According to one embodiment, the real-time metrics data includes information on sales of products or services by the plurality of virtual or physical retail stores. The products or services may include upsell and cross-sell products or services.

According to one embodiment, the processor dynamically generates benchmark data based on the collected real-time metrics data. The processor also determines, for the particular retail store, performance of the retail store based on the benchmark data, and outputs a recommendation based on the comparison.

According to one embodiment, the recommendation relates to staff for handling customers by the particular retail store.

According to one embodiment, the recommendation relates to products or services to be offered by the particular contact center.

According to one embodiment, the real-time metrics data includes interaction data collected from interactions between a customer and a website associated with the particular retail store.

According to one embodiment, the collected interaction data is anonymous and stored without identification of the customer.

According to one embodiment, the particular customer is identified in response to the customer visiting a physical store associated with the particular website. An apparatus at the physical store is configured to transmit one or more identifiers for identifying the customer. The processor receives the one or more identifiers transmitted by the apparatus, and associates the stored interaction data to the customer based on the one or more identifiers.

According to one embodiment, interaction with the customer in the physical store is modified based on the associating of the interaction data to the customer.

According to one embodiment, the apparatus at the physical store is coupled to a scanner configured to scan the one or more identifiers from material provided by the customer.

DETAILED DESCRIPTION

Figure 1:
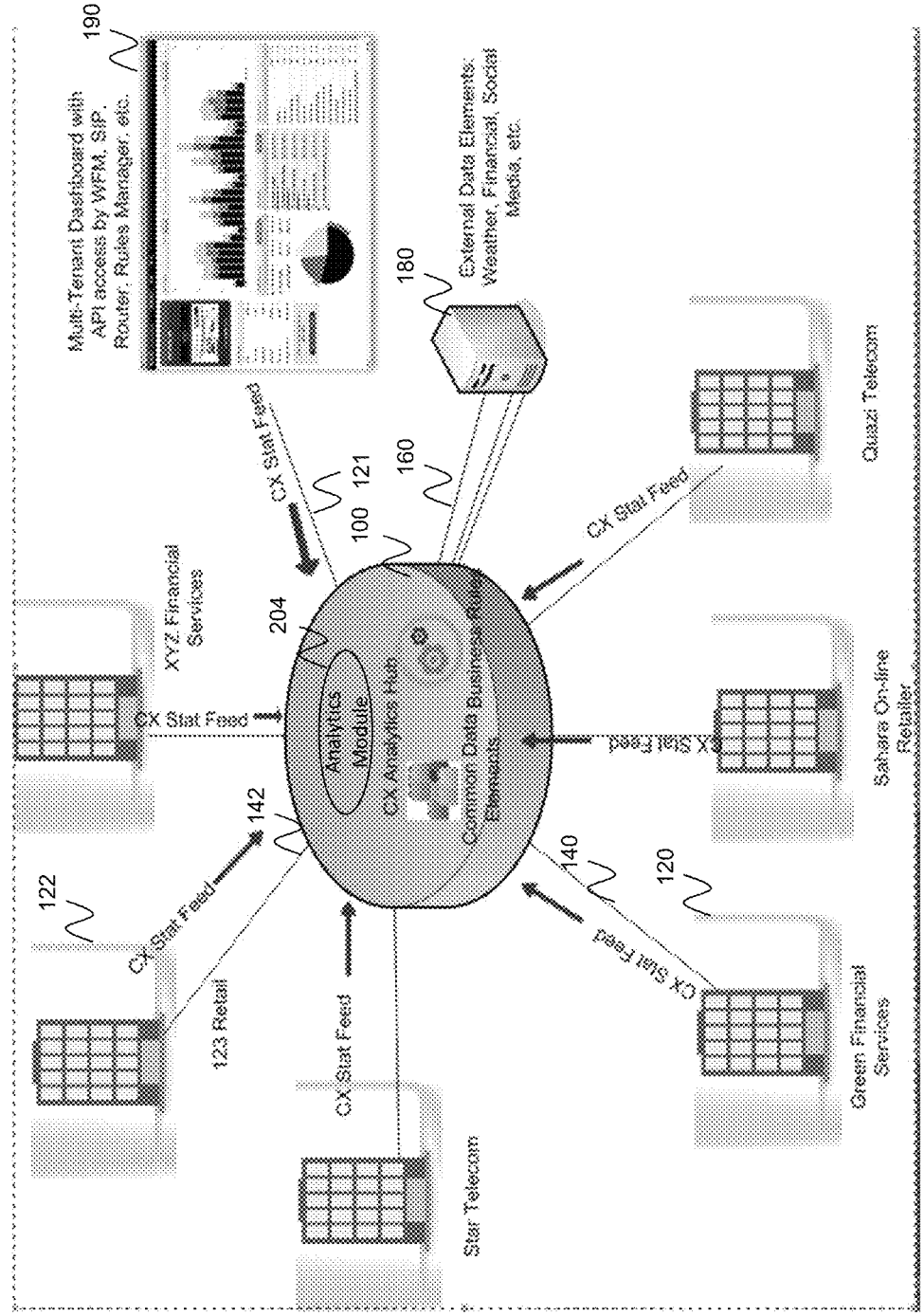
FIG. 1 is a schematic block diagram of a system for enterprise data collection, analytics, and recommendation according to one embodiment of the invention.

In general terms, embodiments of the present invention are directed to an analytics data aggregator and statistical datamart (referred to as CX analytics hub) configured to collect CX and analytics data from multiple contact centers and associated (physical or virtual) retail stores (collectively referred to as tenants), and makes specific data elements available to the one or more tenants for their evaluation and use. According to one embodiment, the data is available either through a robust dashboard and/or through API's which may be used by the tenant to manipulate different decisions that may affect customer experience, such as, for example, interaction routing, work-force management (WFM) scheduling, cross-sell opportunities, music on hold, escalation options, and/or the like.

According to one embodiment, the dashboard is accessible by an administrator that monitors and adjusts contact center optional elements based on the data elements displayed via the dashboard. According to one embodiment, a computer-to-computer business rules engine may have preprogramed algorithms that also react to the data elements and automatically adjust or make adjustment recommendations to the administrator.

View of data via the dashboard may depend on the role assigned to the user. For example, a tenant may access a limited view of the dashboard to monitor its real-time (or near real time) performance with respect to various types of KPIs, such as, for example, average wait time, call length, escalations, repeat callers, and the like. Various views of the dashboard may also be created to allow tenants to compare different contact center statistics based on any criteria, including, for example, industry, company size, social media, weather, financial markets, and the like.

According to one embodiment, the aggregation of data across multiple tenants in real-time allows the analytics hub to generate benchmark data in real-time. The benchmark data may be normalized across different size and types of contact centers prior to storage and/or use. The normalized benchmark information may be used to compare current contact center performance against its peers. Changes to contact center strategies may be made based on such comparison. Because the benchmark data is aggregated in real-time from different data sources, the data is more accurate and relevant to current contact center business than, for example, benchmark data published at much later time.

According to one embodiment, the analytics hub is configured to correlate the aggregated CX data against external events. For example, the analytics hub may be coupled to a server that provides information, for example, on weather and other environmental conditions present when the data was aggregated. The data correlation may allow the contact center to predict cause and effect. This in turn allows the contact center to modify its behavior, such as, for example, interaction routing, scheduling of agents, and the like. For example, local weather data may be consulted to decide the probability that an agent will be late or not show up to work if there is a large storm, given past trends when similar weather conditions were encountered. Recommendations can be made to the contact center systems to adjust routing priorities based on the calculated probability.

The analytics hub may also be configured for the following:

Real-Time Display of KPI's—display the actual estimate of a contact center's KPI.

Performance Status Indicators—For each KPI and for each company, indicate how the current KPI value compares to similar companies in terms of size, industry, and other normalization factors. Visual indicators may be used to indicate performance: 1) green to indicate above average performance; 2) yellow to indicate average performance; and 3) red to indicate below average performance.

Decision Support—provide decision support by simulating the effect of setting lower level factors such as staffing and training levels, the specifics and frequencies of the sales efforts, routing strategies, call center policies, and the like, on top-level KPIs, without actually trying it. The simulation may be based on current contact center data, other companies' data, time based events, and/or other event data.

Automatic Recommendations—automatically suggest changing factors such as staffing and training levels, the specifics and frequencies of the sales efforts, routing strategies, call center policies, and the like, in order to optimize top-level KPIs.

FIG. 1 is a schematic block diagram of a system for enterprise data analytics and recommendation according to one embodiment of the invention. The system includes a CX analytics hub server 100 coupled to various contact center systems 120 and associated retail store systems 122 via data communication links 140, 142. The data communication links 140, 142 may be wired and/or wireless links traversing a data communication network such as, for example, a local area network, private wide area network, and/or public wide area network such as the Internet.

According to one embodiment, the server 100 is located in a remote computing environment such as, for example, a remote cloud computing environment. The server may, in addition or in lieu of being hosted in the remote cloud computing environment, be located in a data center associated with one or more tenants. One or more of the infrastructure needed for providing contact center services for a tenant may also be hosted in the remote computing environment. In this case, contact center services may be provided from the remote computing environment by a cloud service provider on behalf of multiple tenants as a software as a service (SaaS), over a wide area network. Some of those services may also be provided from the tenant's local contact center system 120. In addition, the retail stores associated with the contact centers may be physical stores and/or virtual stores provided, for example, via a web site.

Various types of data including company data, promotions or campaign run by the contact center, customer experience data (including sentiment, interaction results, interaction lengths, customer satisfaction, etc.), contact/retail center statistics data (e.g. average handle time, resolution rate, wait time, average hold duration, etc.), sales data, interaction data, tenant workforce data (agent/employee sick days, schedules, etc.), and/or other contact/retail center factors, all of which are collectively referred to as CX data, are provided by the contact center systems 120 and retail store systems 122 on behalf of the various tenants to the hub server 100 over the data communication links 140, 142. According to one embodiment, the data is provided to the hub server 100 in real-time as the data is gathered by each of the contact center systems 120 and retail store systems 122. The term real-time as used herein is understood to mean substantially real-time (e.g. within minutes, seconds, etc. after the data is generated). As one example, a particular contact center system 120 may be configured to transmit data compiled, for example, in the past 15 minutes, as their real-time CX data.

The hub server 100 is configured with one or more modules including, for example, an analytics module 204 configured to analyze and aggregate the data into, for example, statistical tables and/or objects (referred to as a CX object) stored in a data storage device. The data storage device may take the form of a hard drive or disk array conventional in the art. According to one embodiment, different objects may be created and published for different KPIs that drive contact center objectives. For example, an object may be created for one or more contact center statistics (e.g. average call length, average queue length, escalations, etc.), customer experience and sentiment, business value and classification, upsell/cross-sell attempts, and the like.

According to one embodiment, each object is defined by one or more parameters and/or attributes, and associated with methods that may be queried by a subscribing client to access the aggregate data. For example, one method may be invoked to pull statistical data collected by the object across various tenants. Specific parameters provided to the method may qualify the statistical data to be pulled, such as, for example, data relating to particular time periods, particular types of business, particular contact center sizes, and the like. Another method may be invoked by a subscribing client to push data to the object to be aggregated into the statistical data collected by the object. For example, occurrence of a sales event may trigger push of sales data to an object related to upsell attempts. Once generated, the objects may be used to display statistical data, generate benchmark values, make recommendations based on business rules, and the like. The recommendations may be for improving performance of the contact center based on what is learned from other tenants.

According to one example, an object may provide access to an average wait time calculated across many contact centers for a given type of call (inbound, outbound, retail, financial services, etc.) A subscribing client, such as a dashboard or premise routing device, may query the object to either provide comparison data or make a programmatic decision on how to treat a call. For example if the comparison indicates that the current contact center is processing calls at a better rate than the average of all contact centers, such data may be depicted via the dashboard. A router server in the contact center system could then programmatically decide how to route the call at that service level.

According to one embodiment, the hub server 100 is coupled to external data sources 180 over a communication link 160, which may be similar to communication link 140. External data from the external data sources may be pulled by or pushed to the hub server 100 for correlating CX data with the external data. The external data may relate, for example, to weather, traffic, research, geopolitical events, socioeconomic influences, KLOUT scores, social media information, and the like, not generally available or provided by the retail systems 122 or contact center systems 120.

According to one embodiment, CX data gathered across various tenants may be used to detect trends and/or themes across different customer types and/or external events. In this regard, the analysis module may determine that a particular type of CX data and/or external event has high or low statistical correlation to certain outcomes. Such determination may be made after observing, either automatically or semi-automatically, how closely the CX data and/or external event tracks with certain outcomes over time and over various tenants. The analysis module may make recommendations based on the deduced correlations. The recommendations may relate to contact center routing, scheduling of agents, cross-sell/upsell efforts, escalation options, coaching scripts, and/or the like. A feedback loop back to the hub server 100 with actual outcome data allows the server to learn and improve based on the actual outcomes from the recommendations.

For example, analysis of statistical data may indicate that a particular contact center metric is highly correlated to a particular KPI, such as, for example, service level. Recommendations may be made to modify the particular contact center metric in order to achieve a desired value for the KPI. In another example, correlations may be found between certain CX data and agent churn. If analyzed data indicates a high probability that an agent may quit, modifications may be recommended to reduce such probability, to hire additional staff based on such probability, and/or the like.

According to one embodiment, the hub server 100 is also coupled to a plurality of end user devices 190 over communication link 121, which may be similar to communication link 140. The end user devices 190 may be desktops, laptops, tablets, and/or mobile devices accessible to the various tenants to access the CX objects and view specific data elements authorized to the tenants. The level of access via the dashboard, including access to sensitive information, may depend on user roles. For example, the dashboard may allow display of tenant specificities for the particular tenant, but the particular tenant may not have access to another tenant's specific or sensitive data. The particular tenant may, however, view benchmark and general statistics data generated by aggregating and analyzing CX across multiple tenants.

According to one embodiment, a global administrator, such as a hub manager, may have access to specific data for all tenants for which data is being aggregated.

Figure 2:
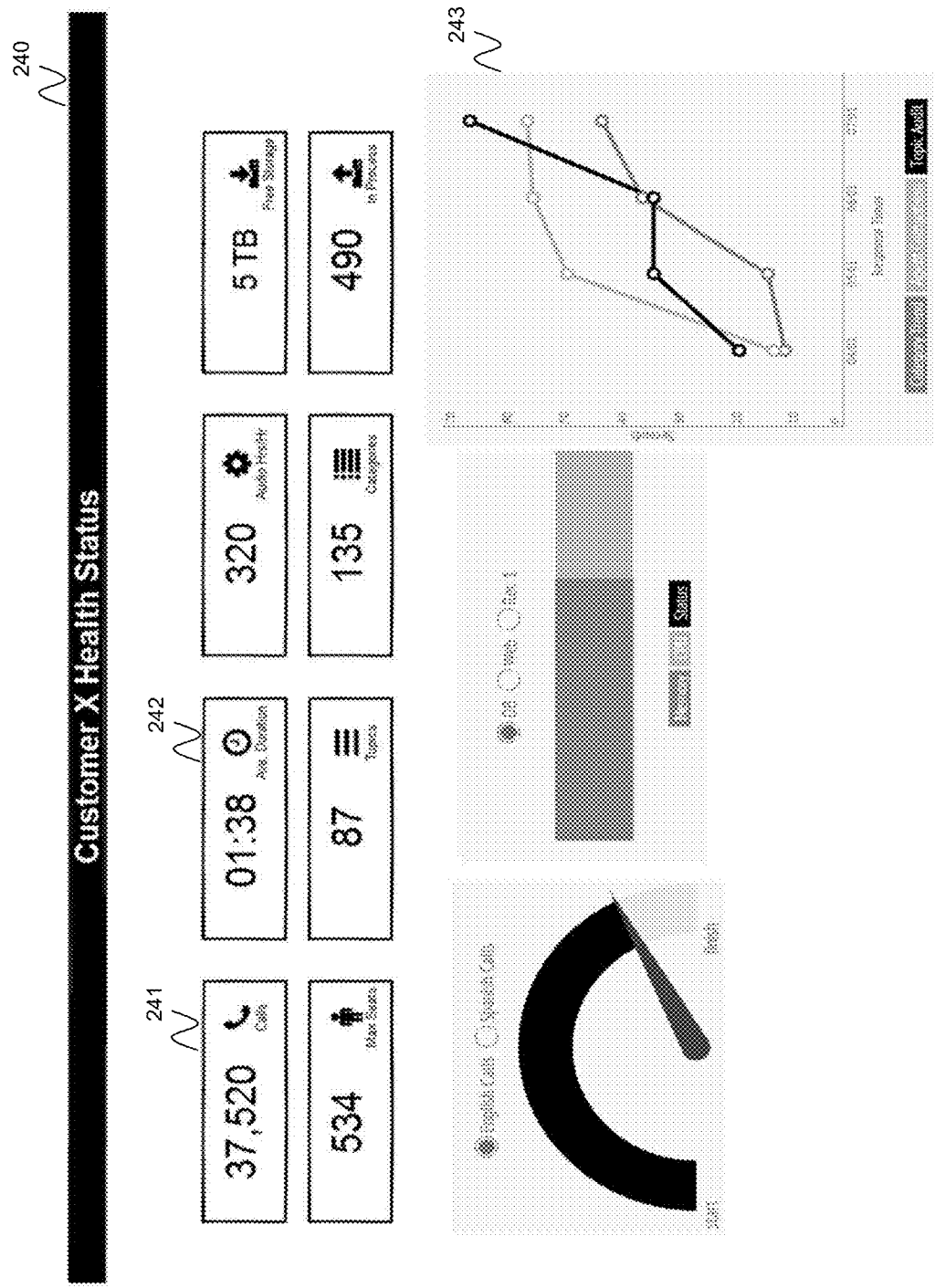
FIG. 2 is an exemplary screen shot of a multi-tenant dashboard according to one embodiment of the invention.

FIG. 2 is an exemplary screen shot of a multi-tenant dashboard 240 according to one embodiment of the invention. According to one embodiment, the dashboard may be used to provide a real-time display of various performance metrics of one or more contact centers. For example, the analytics module may continuously (e.g. every 1 second) predict and display KPI's, or display when information on changes to input values affecting KPI's materializes. Exemplary KPI's that may be displayed include, without limitation, customer satisfaction (CSAT), revenue or sales conversions, cost, customer retention, and the like.

The dashboard may also be used to provide performance status indication for the particular tenant. In this regard, for each KPI of the company, a performance indication may be provided based on comparison to other companies. In this regard, average values of various KPI's may be calculated from data aggregated from different tenants. The values may be normalized based on normalization factors, such as, for example, company size, vertical industry, and the like. The current tenant's KPI may then be compared to the average KPI. The comparison may be, for example, a distance calculation of the tenant's KPI to the average KPI. A color code may then be assigned based on the comparison For example, the tenant's KPI may be highlighted in green to indicate above average performance compared to the tenant's peers, highlighted in yellow to indicate average performance, and highlighted in red to indicate below average performance. Other types of visuals are also contemplated.

In the exemplary dashboard 240 of FIG. 2, real-time contact center metrics for a particular contact center "X" are displayed. In this example, the displayed metrics related to number of calls 241, average duration of each call 242, and the like. Also, a graph 243 of a particular contact center metric may be displayed for a specified category trend, agent, and/or topic.

In general terms, the analytics module 204 of the hub server may be configured to do the following:

1. Each tenant sends CX data elements on a real or near real time basis to the CX analytics hub. The information could include: call types, length, handle time, location, escalation, customer satisfaction, X-Sell attempts, and the like.

2. CX analytics hub collects, stores and aggregates this information into statistical tables and objects.

3. External data (e.g. weather, financial markets, KLOUT Scores, social media information, or any other event data external to the contact center system) is retrieved from external data sources and correlated with the CX data.

4. The CX analytics hub provides dashboard that are configured to view this data, either at the hub level or by each tenant. Policies place restriction of sensitive information.

5. Hub managers can monitor the dashboard and "push" actions back down to a tenant's contact center system. Push information could cause reactions to routing, cross-selling, queue announcements and agent coaching.

6. API's could allow computer to computer systems to automatically react to object values or leverage business rules centrally located in the cloud and either managed by the tenant or a hub manager expert.

7. Tenants may invoke their dashboards to query the aggregated data as, for example, indexes in which tenants may compare their own statistics with sum (or average or some other statistical derivation) of the group of tenants. The group may be global (e.g. all tenants subscribed with the CX analytics hub), regional (e.g. those in a particular geographic region), or based on a vertical industry (e.g. financial, medical, hospitality, etc.).

Figure 3:
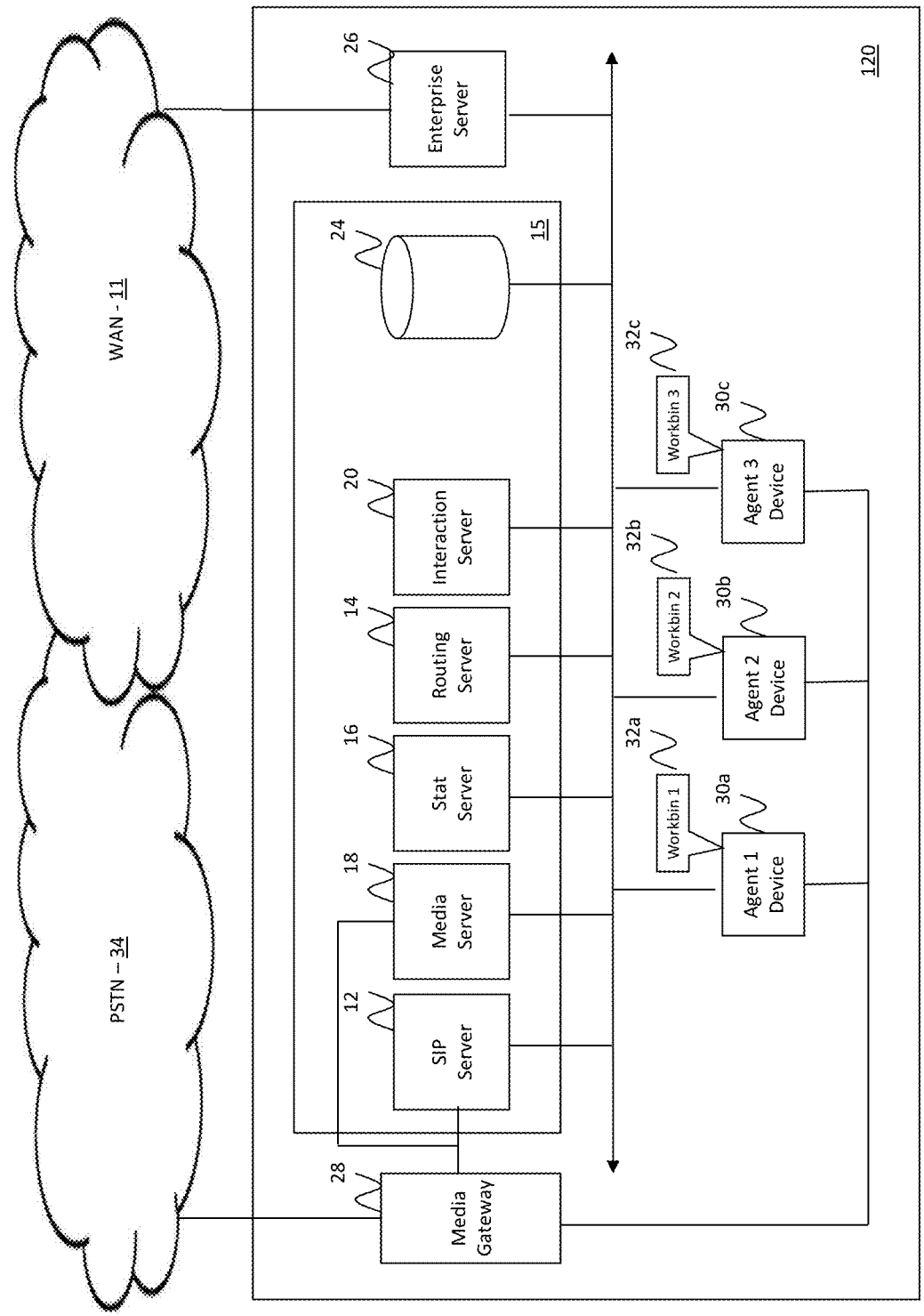
FIG. 3 is a more detailed schematic block diagram of a contact center system of FIG. 1 according to one embodiment of the invention.

FIG. 3 is a more detailed schematic block diagram of any one of the contact center systems 120 of FIG. 1 according to one embodiment of the invention. The contact center system includes one or more various contact center servers such as, for example, a SIP server 12, routing server 14, statistics server 16, media server 18, interaction server 20, and/or the like. One of more of these servers may be configured to exchange data with the hub server 100 over the communication links 140. Although in the embodiment of FIG. 3 it is assumed that the servers 12-20 are hosted locally as a tenant's local contact center system, a person of skill in the art should recognize that one or more of the server may also be hosted remotely in a remote computing environment.

According to one embodiment, the servers 12-20 are implemented as software components that are deployed in the contact center system 120. Although the various servers are described as separate functional units, a person of skill in the art will recognize that the functionality of the various servers may be combined or integrated into a single server, or further subdivided into other separate functional units without departing from the spirit of the invention.

According to one embodiment, the contact center system 120 also hosts a mass storage device 24 which may take form of a hard disk or disk array as is conventional in the art. According to one exemplary embodiment of the invention, such as when the contact center system is hosted by a central data center, the mass storage device 24 stores one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and/or the like. According to one embodiment, some of the data (e.g. customer profile data) may come from a customer relations management (CRM) database.

According to one embodiment, customers, potential customers, or other end users (collectively referred to as customers) desiring to receive services from the contact center may initiate inbound contact to the contact center via their end user devices (not shown). Each of the end user devices may be a communication device conventional in the art, such as, for example, a telephone, wireless phone, smart phone, personal computer, electronic tablet, and/or the like. Users operating the end user devices may initiate, manage, and respond to telephone calls, emails, chats, text messaging, web-browsing sessions, and other multi-media interactions.

Inbound and outbound interactions from and to the end users devices may traverse a telephone, cellular, and/or data communication network depending on the type of device that is being used and the type of media channel that is invoked. For example, the communications network may include a private or public switched telephone network (PSTN) 34, the wide area network 11, and/or the like. The communications network may also include a wireless carrier network including a code division multiple access (CDMA) network, global system for mobile communications (GSM) network, and/or any 3G or 4G network conventional in the art.

According to one exemplary embodiment, the contact center includes a media gateway 28 coupled to the PSTN network 34 for receiving and transmitting telephony calls between end users and the contact center. The media gateway 28 may take the form of an automatic call distributor, a private branch exchange (PBX), an IP-based software switch, and/or any other switch or gateway configured to receive Internet-sourced calls and/or telephone network-sourced calls. According to one exemplary embodiment of the invention, the media gateway 28 is coupled to a SIP (Session Initiation Protocol) server 12 which may, for example, serve as an adapter or interface between the media gateway and the remainder of the routing, monitoring, and other call-handling components of the contact center. Although SIP is used as an example protocol to which the server 12 adheres, a person of skill in the art will understand that any other protocol other than SIP may be used for processing telephony calls between customers and the contact center.

According to one embodiment, interactions other than telephony interactions are received by an enterprise server 26 and forwarded to the interaction server 20 for further handling. The other types of interactions may include, for example, email, vmail (voice mail through email), chat, video, text-messaging, web, social media, co-browsing, web real time communication (WebRTC), and the like. In this regard, the enterprise server 26 may take the form of an email server, web server, and/or the like. According to one embodiment video and WebRCTC calls are handled by the SIP server 12 instead of the interaction server 20. Also, according to one embodiment, a central interaction server 20 handles the various non-telephony interactions for the contact center. Multiple interactions servers may also be deployed in other embodiments. The multiple interaction servers may allow handling of various non-telephony interactions concurrently. The multiple interactions servers may also serve as backup servers that are passive during normal operation, but become active when the central interaction server is down. The same may apply for other components of the contact center system, such as, for example, the routing server 14.

The routing server 14 may be configured to work with the SIP servers 12 and/or interaction server 20 for routing interactions to a contact center target based on a routing strategy associated with a particular route point (e.g. a called number). Depending on the type of routing strategy configured for the route point, different options, voice treatments, and routing is performed for the interaction.

The media server 18 may be configured to identify parameters (e.g. available media ports on the media server) for establishing voice conversations between a customer and a contact center target. The media server 18 is also configured to deliver media to customers and/or agents. For example, the media server 18 may be invoked to provide initial greeting messages to a calling customer, and interactive voice response (IVR) treatment to obtain basic customer information (e.g. identification information, reason for the call, etc.). If the customer or agent is placed on hold, the media server 18 may be invoked to play music for the holding customer or agent. In another example, if a conversation between the customer and agent is to be recorded, the call may traverse the media server so that the customer and agent may engage in a three way conversation with the media server, and the media server may record the conversation and store the recorded conversation in a database.

The statistics server 16 may be configured to gather, store, analyze, and/or deliver data regarding various resources of the contact center. Such data may include data regarding agent availability, average handling time, average hold time, total talk time, after work time, average speed of answer, service level statistics, abandonment rate, patience rate, and the like. The delivery of statistics data may be to subscribing clients, such as, for example, delivery of agent status to the routing server 14, and real-time statistics to the hub server 100.

The contact center system may include other servers as will be conventional in the art. For example, the contact center system may include a configuration server for configuring the various servers and other aspects of contact center functionality as will be appreciated by a person of skill in the art. The contact center system may also include one or more reporting servers configured to provide real-time reporting based on statistics data provided by the statistics server 16.

According to one embodiment, a telephony call is received by the media gateway 28 and the SIP server 12 is invoked for further handling. The SIP server 12 invokes the routing server 14 (e.g. by sending an event message) for retrieving a routing strategy for routing the call to an appropriate target. If the call is to be routed to a contact center agent, the routing server 14 identifies an appropriate agent for routing the call. The selection of an appropriate agent may be based, for example, on a routing strategy employed by the routing server 14, and further based on information about agent availability, skills, and other routing parameters provided, for example, by the statistics server 16.

The routing server 14 signals the SIP server 12 with information on the agent to which the call is to be routed. In this regard, the SIP server 12 transmits one or more SIP messages to establish a connection between the customer end device and an agent device 30*a*-30*c* (collectively referenced as 30). Collected information in the mass storage device 24 about the caller and/or the caller's historical information may also be provided to the agent device for aiding the agent in better servicing the call. In this regard, each agent device 30 may include a telephone adapted for regular telephone calls, VoIP calls, and the like. The agent device 30 may also include a computer for communicating with one or more servers of the contact center and performing data processing associated with contact center operations, and for interfacing with customers via voice and other multimedia communication mechanisms.

According to one embodiment, if there are no available agents to handle the call, the media server 18 may be invoked for playing different types of media (e.g. music) while the call is put on hold. The media server 18 may also be configured to provide messages indicative of how long the customer has to wait before an agent becomes available to handle the call. According to one embodiment, agents at other CC sites may be invoked to handle the call if there are no available agents at the current CC site.

According to one exemplary embodiment of the invention, the routing server 14 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity may be pushed to the agent, or may appear in the agent's workbin 32*a*-32*c* (collectively referenced as 32) as a task to be completed by the agent. The agent's workbin may be implemented via any data structure conventional in the art, such as, for example, a linked list, array, and/or the like. The workbin may be maintained, for example, in buffer memory of each agent device 30.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Embodiments of the present invention are also directed to providing decision support to contact centers based on what is learned from data aggregated from other tenants. In this regard, the analytics module 204 in the hub server 100 is configured to simulate/predict the outcome of one or more KPI's based on modification of one or more contact center parameters, without actually making those modifications. The prediction may be based on outcomes learned from other similar contact center tenants who have actually made the modification and provided results as CX data over communication links 140.

Figure 4:
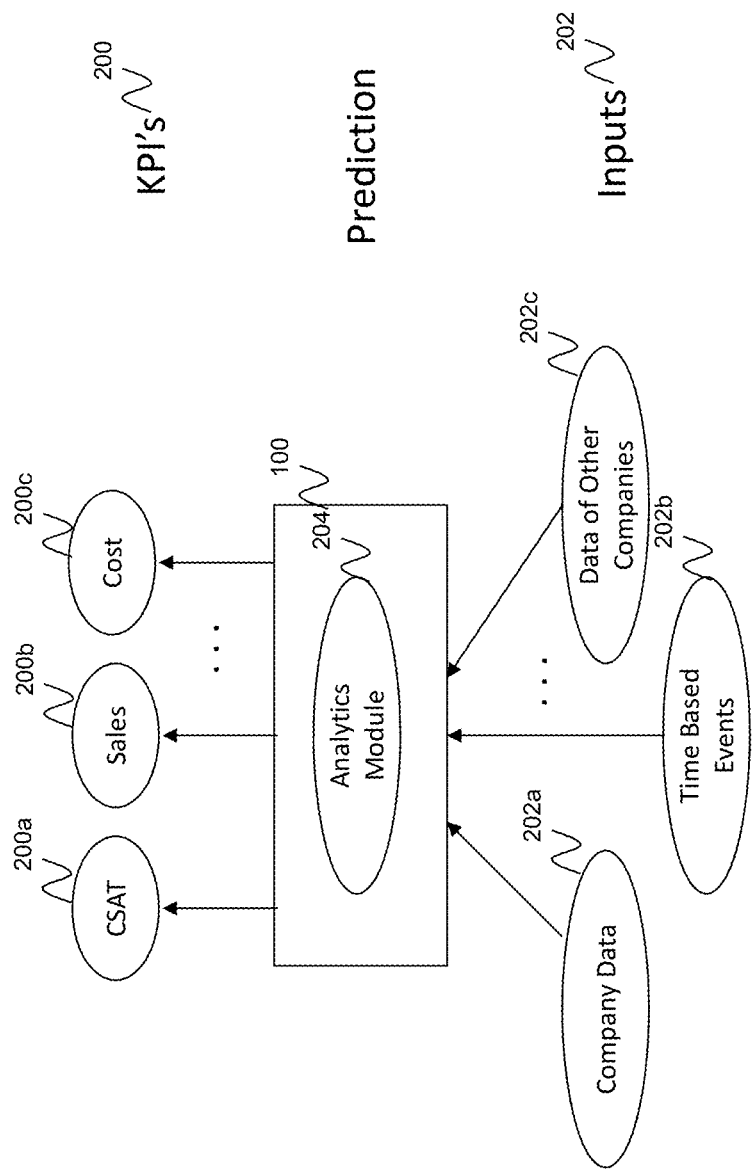
FIG. 4 is a conceptual layout diagram of elements invoked for providing decision support for a contact center according to one embodiment of the invention.

FIG. 4 is a conceptual layout diagram of elements invoked for providing decision support for a contact center according to one embodiment of the invention. According to one embodiment, the analytics module 204 is configured to provide prediction and simulation of top level KPI's 200 based on one or more input variables 202 provided to the hub server 100 by the various contact center systems 120 and retail systems 122. According to one embodiment, the input variables are based on the CX data provided by the various tenants, and may include, for example, company data 202*a*. Company data may include, for example, sales information, customer sentiment, size of company, and/or any other measurable data about the company contact center and retail presence. The company data may also include but is not limited to the following:

AHT—Average Handle Time

FCR—First Call Resolution

Cost per Contact—Total of all costs associated with answering a call or handling a contact divided by the total number of calls or contacts.

Occupancy—Occupancy is the amount of time an agent spends either talking or in after call work from handling a customer call.

Blocking—Percent of calls offered that are not allowed into the system; generally % receiving busy, but may also include messages and forced disconnects.

Call Disposition Distribution—The reason for the customer call for inbound calls. This information can be learned from speech analytics using conventional speech analytics systems conventional in the art.

Sales Conversion Rate—From the calls that contain sales attempts, which portion resulted in successful sales.

Supervisor or Escalation Request Percentage—represents the portion of calls from the overall call volume that the customer has asked to speak to a supervisor. This information can be learned from performing speech analytics using conventional speech analytics systems.

The input data provided to the analytics module 204 for prediction may also include data of other companies 202*c* as well as time-based event data 202*b*. The data of other companies 202*c* may mirror the company data 202*a*. The time-based event data 202*b* may include data on specific events tied to particular time periods, such as, for example, seasonal events, special events, promotions planned by the company, and the like. The time-based event data may relate to the company or be external events not necessary tied to the company, such as, for example weather data, financial market data, and the like, provided by the external data sources 180.

The analytics module 204 receives the input data and generates an analytical model using predictive analytics. According to one embodiment, the analytical technique that is employed may be a regression technique that establishes a mathematical equation as a model to represent interactions between the input variables 202 and the KPIs 200. An exemplary regression learning technique utilizes classification and regression trees (CART). More details on CART is provided by Lewis, J. Roger, *An Introduction to Classification and Regression Tree (CART) Analysis*, Annual Meeting of the Society for Academic Emergency Medicine (San Francisco, Calif. 2000), the content of which is incorporated herein by reference. Of course, any other analytical technique conventional in the art may be used in addition or in lieu of CART.

According to one embodiment, a regression decision tree is modeled for each KPI After a decision tree is learned based on current values, changes may be made to one or more input variables 202 to observe how the values affect a particular KPI. Such values may be displayed on a graphical user interface, such as, for example, the dashboard described above. According to one embodiment, a manager viewing the results of the simulation may transmit a command, via the end user device, to the appropriate contact center system 120, to effectuate the change.

According to one embodiment, a desired/optimal KPI may also be set by the manager via the graphical user interface, and the simulation run to identify various permutations of the input variables 202 that is predicted to achieve the desired KPI. The various permutations of the input variables may then be displayed on the graphical user interface for selection by the manager as to the particular permutation that is desired to be implemented.

Figure 5A:
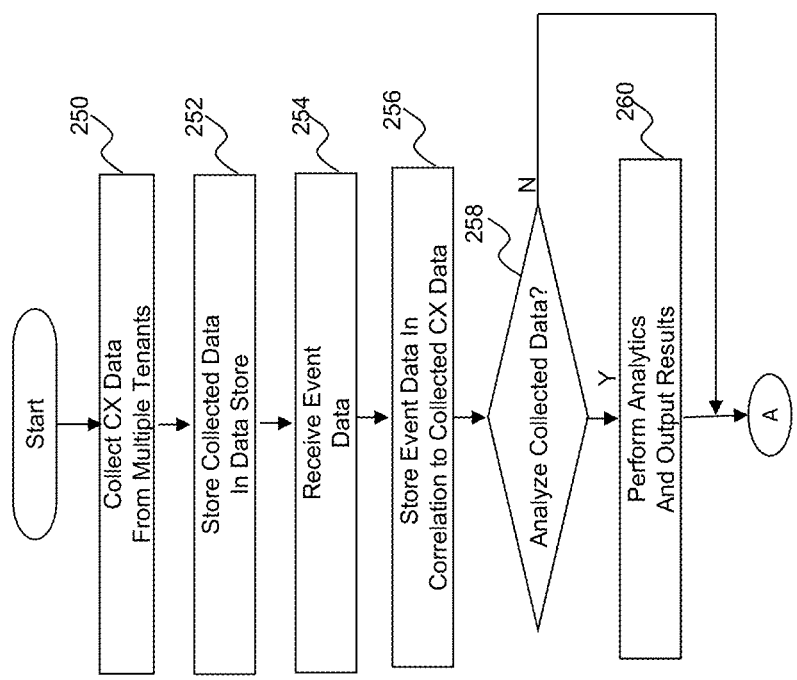
FIGS. 5A-5B are flow diagrams of a process for collecting and analyzing data from multiple tenants and providing decision support based on the analyzed data according to one embodiment of the invention.
Figure 5B:
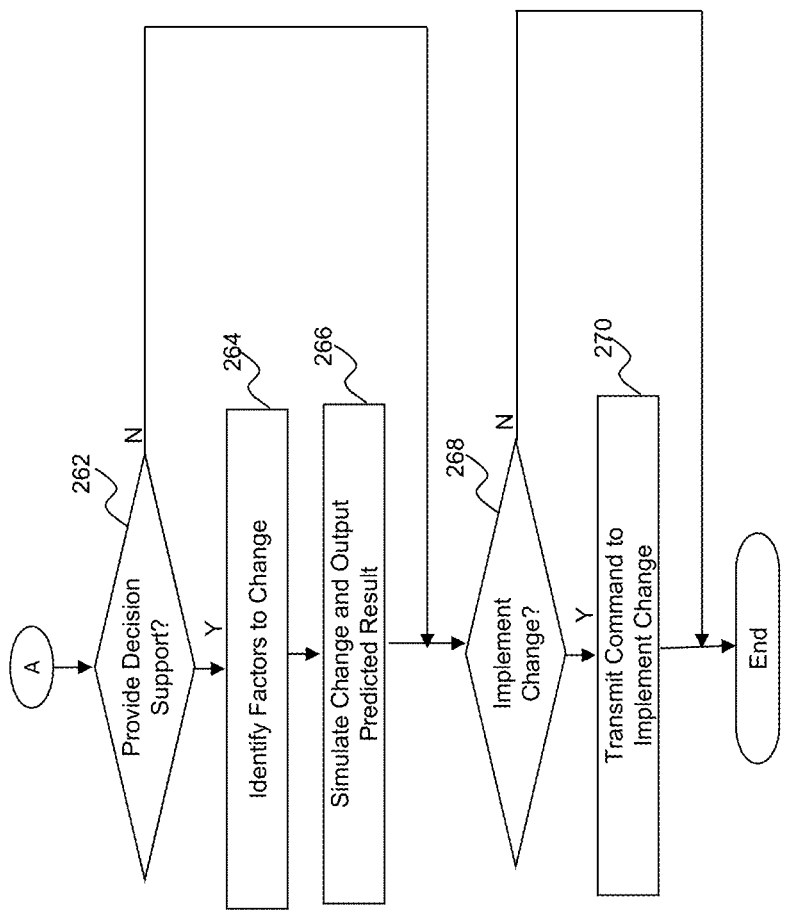

FIGS. 5A-5B are flow diagrams of a process for collecting and analyzing data from multiple tenants and providing decision support based on the analyzed data according to one embodiment of the invention. The process may be described in terms of a software routine executed by a processor in the hub server 100 based on instructions stored in the server's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The process starts, and in act 250, the analytics module aggregates CX data from multiple tenants. In this regard, the analytics module invokes one or more CX objects to monitor for data updates provided by the contact center systems 120 and retail systems 122 (also referred to as source devices). The source devices may be configured, in one example, to push data updates to objects to which they have subscribed. For example, the various systems may have subscribed to an "interaction handle time" CX object for providing real-time updates on interaction handling times experienced by the source devices. According to one embodiment, data provided by the source devices is accompanied by metadata information identifying, for example, the source of the data.

In act 252, the data that is collected by the CX object is stored in the data storage device in correlation with the particular tenant providing the data.

In act 254, the analytics module 204 receives event data from the external data sources 180. As a person of skill in the art should appreciate, act 254 may occur concurrently with acts 250 and 252. The event data may relate to weather, traffic, research, geopolitical events, socioeconomic influences, KLOUT scores, social media information, and the like, not generally available or provided by the retail systems 122 nor contact center systems 120.

In act 256, the event data is stored in the data store in correlation with the CX data collected by one or more objects. For example, the data may be correlated based on a date and time in which data was collected. Collecting and analyzing such external events allows contact center performance to be evaluated in light of those events.

In act 258 a determination is made as to whether the collected data is to be analyzed. In this regard, the analytics module may monitor for a user-command to trigger the analysis. Analysis may also be triggered automatically upon detecting a condition (e.g. a preset time, time interval, amount of data collected, etc.).

In act 260, the analytics module 204 engages in analysis of data obtained across multiple tenants, along with any external event data obtained from the external sources 180, and outputs the results. According to one embodiment, the analytics may include generating or updating one or more predictive models based on the obtained data. The predictive models may be for example, one or more prediction trees designed to model a correlation between the types of data that is collected, and one or more KPIs. The prediction trees may be regression trees and/or classification trees as are well understood by a person of skill in the art.

Enterprise analytics may also include generating real-time benchmark data for one or more KPIs based data collected across all subscribing tenants, a segment of those tenants (e.g. segmented based on size, vertical industry, geographic region, etc.), and the like. As an example, the "interaction handling time" CX object may be configured with functions to compute real-time benchmark data relating to interaction handling times. The computed benchmark value may be, for example, a sum or an average of all or a portion of the collected call/customer handling times from the various tenants, normalized based on one or more normalization factors, such as, for example, contact center size.

The benchmark data may be stored in the data storage device and also provided to one or more contact center systems 120 and/or retail systems 122 for evaluation and use. For example, the benchmark data may be displayed on the dashboard 240 for a particular tenant along with the tenant's specific performance metrics. A performance indicator may also be displayed for alerting a tenant of its performance relative to the benchmark. For example, the tenant data may be displayed with a first visual indication (e.g. a first color) when the tenant's performance is within upper and lower limits of the benchmark, and a second visual indication (e.g. a second color) when the tenant's performance is below the lower limit of the benchmark.

In some instances, not all data from all tenants may be accessible to the analytics module 204 for analysis (e.g. to compute the benchmark data). For example, it may be desirable to keep certain data confidential and not accessible for analysis, due to, for example, regulations that mandate such confidentiality (e.g. PCI, HIPPA, etc.). Also, in scenarios where there is only one direct competitor, a tenant may not want to disclose its data for analysis as it would expose its confidential information to the competitor. For example, if a tenant is a medical bills collection agency with 200 agents, and the tenant has one direct competitor with exactly the same size that is also subscribed to the analytics hub 100, any benchmark data provided to the tenant would be the data of the direct competitor, which the competitor may want to keep confidential.

According to one embodiment, known algorithms may be used to generate benchmark data even when there is missing data from one or more tenants. Such known algorithms may include, for example, backoff algorithms as described in further detail by Katrin Kirchhoff, et al., "Factored Language Models Tutorial," University of Washington, Dept. of EE, *UWEE Technical Report*, UWEETR-2008-0004 (February, 2008), the content of which is incorporated herein by reference. According to one embodiment, the backoff algorithm is used to generate a prediction or estimation when there is insufficient data to fully make the prediction or estimation of a high-order conditional probability table. Instead of attempting to estimate the entire table, a portion of the table is estimated, and the remainder is constructed from a lower-order model. Thus, in the above example where the direct competitor with 200 seats does not want to reveal his CX data, benchmark data may still be provided to the competing tenant using the backoff algorithm. In this regard, the backoff algorithm takes into account other information both from contact center with 200 agents in different verticals, as well as other collection agencies from different sizes, to make up for the missing data from the direct competitor and allow the benchmark data to be generated.

In act 262, a determination is made as to whether decision support should be provided to a particular tenant for helping the tenant decide how to change contact center performance to reach desired goals. Decision support may be manually invoked by an administrator via the tenant's dashboard 240. For example, the administrator may request decision support upon evaluating the tenant's statistics against, for example, benchmark statistics. According to one embodiment, decision support allows the administrator to simulate changes of particular contact center factors to examine the outcomes that the changes might bring. For example, the administrator may change factors such as staffing schedules, training levels, upsell/cross-sell items and their frequencies, routing strategies, other call center policies, and the like, and watch how such changes affect one or more KPIs.

According to one embodiment, decision support may also be automatically invoked or recommended by the analytics module upon detection of a trigger. The trigger may be, for example, the value of a monitored KPI falling below a set goal of the company, below a particular benchmark value, and/or the like. The analytics module may alert the tenant administrator of the detected condition and recommend that changes be made to one or more contact center factors in response to the detected condition. If the tenant administrator indicates that he wants assistance in determining which factors to change, the analytics module may allow the contact center administrator to simulate the effect of changes to various contact center factors.

Accordingly, in act 264, the analytics module identifies one or more factors to be changed during the simulation (e.g. based on user input).

In act 266, the analytics module simulates the outcome of one or more KPIs based on the identified change. In this regard, changes are made to one or more input variables of one or more prediction trees, and changes to the values of the KPIs associated with the prediction trees are observed, if any. The output from the prediction tress is then displayed, for example, on the tenant's dashboard.

According to one embodiment, instead of the user determining the factors to be changed during the simulation, the analytics module may be configured to recommend which factors should be changed and how, based on identification of a specific KPI goal for the particular tenant. The specific KPI goal may be input, for example, by the administrator, or selected automatically by the analytics module. For example, the desired KPI may be based on benchmark data provided by the analytics module.

In response to identification of the desired KPI, the analytics module may run various permutations of the input variables of the associated prediction tree to observe which permutations achieve the desired KPI value. If there are alternative ways to reach the desired KPI, the analytics module may be configured to provide the alternative ways for user consideration and review. For example, if the KPI relates to call response time, and the goal is to decrease the call response time by a set amount, running the simulation may indicate that the goal may be reached by increasing the number of agents by X, or shortening the interaction handle time by Y. Both options/factors may be displayed to the user for consideration.

In act 268, a determination is made as to whether the recommended and/or simulated change is to be implemented. If the answer is YES, the analytics module may interact with one or more contact center and/or retail system modules in act 270 to implement the change. For example, if the factor to be changed relates to scheduling of agents, a command may be transmitted by the analytics module to, for example, a workforce management system for the particular tenant for implementing and/or suggesting the change. In another example, if the factor to be changed is a routing strategy, a command may be transmitted, for example, to the routing server 14 of the tenant's contact center system 120 for implementing the change. In yet another example, if the factor to be changed is the frequency of an outbound marketing call, a command may be transmitted, for example, to an outbound server of the contact center system 120 for implementing the change.

Retail Application

Embodiments of the present invention are also directed to a retail application that is run on an end user device that is used by a store representative at a company's retail store. According to one embodiment, the end user device may be a computer, laptop, table, smart phone, kiosk terminal, and/or the like, coupled to the retail store system 120 and in communication to the hub server 100 and the corresponding contact center system 120. According to one embodiment the retail application in the end user device collects and transmits data to the hub server 100 via the retail store system 120. Data and recommendations made by the hub server 100 may also be accessible via the retail application. The recommendations may be, for example, to optimize performance at the retail store. Although a retail store is used as an example, a person of skill in the art should recognize that the embodiments of the present invention apply to other contexts and businesses, such as, for example, hospitals, banks, utility companies and the like.

According to one embodiment, the retail application is configured for one or more of the following:

1) Personalize customer interactions in the store.
2) Provide visibility into retail store traffic and resources.
3) Manage traffic flow into the store using queuing mechanisms.
4) Provide reports and/or data (e.g. to hub server 100) on sales conversions, number of customers redirected to self service, percent of reduced call volumes to other channels, and trend analysis.
5) Assign customers to sales staff.
6) Manage customer appointments.
7) Record in-store conversations.
8) Provide dynamically modifiable coaching scripts and upsale possibilities.
9) Provide a bridge to the customer's online journey.

Figure 6:
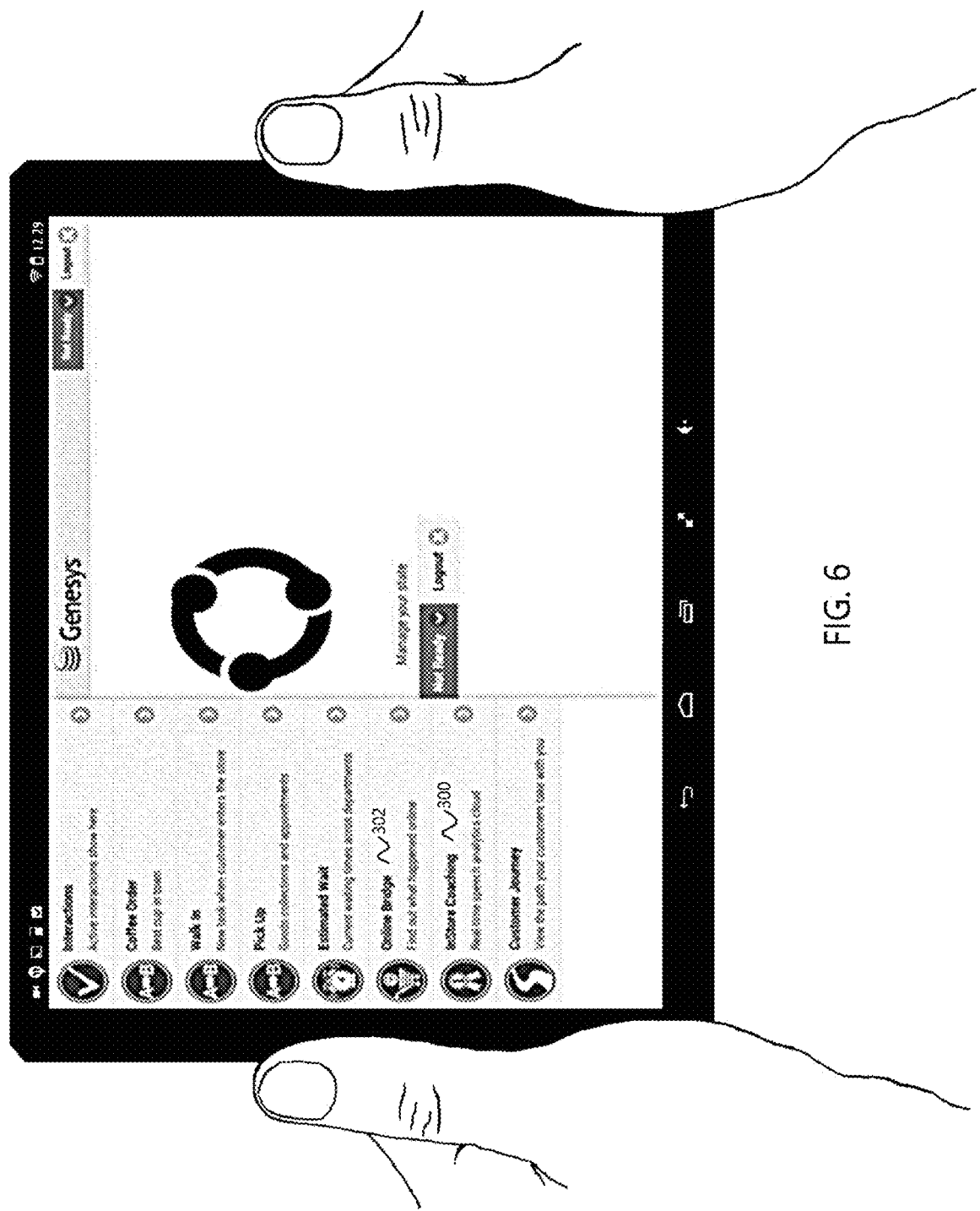
FIG. 6 is an exemplary screen shot of a graphical user interface (GUI) provided by the retail application according to one embodiment of the invention.

FIG. 6 is an exemplary screen shot of a graphical user interface (GUI) provided by the retail application according to one embodiment of the invention. The application provides a coaching option 300 for allowing a live recording and analysis of a coaching session between a store representative and a store manager.

FIGS. 7A-7D are screen shots of the GUI displayed in response to a user selection of the coaching option 300 according to one embodiment of the invention. According to one embodiment, the retail application provides a connection option 304 for allowing the user to initiate a connection to a contact center server, such as, for example the SIP server 12 in the company contact center system 120, for initiating the recording. Of course, the SIP server 12 may also be hosted in the remote cloud computing environment as discussed above.

Figure 7A:
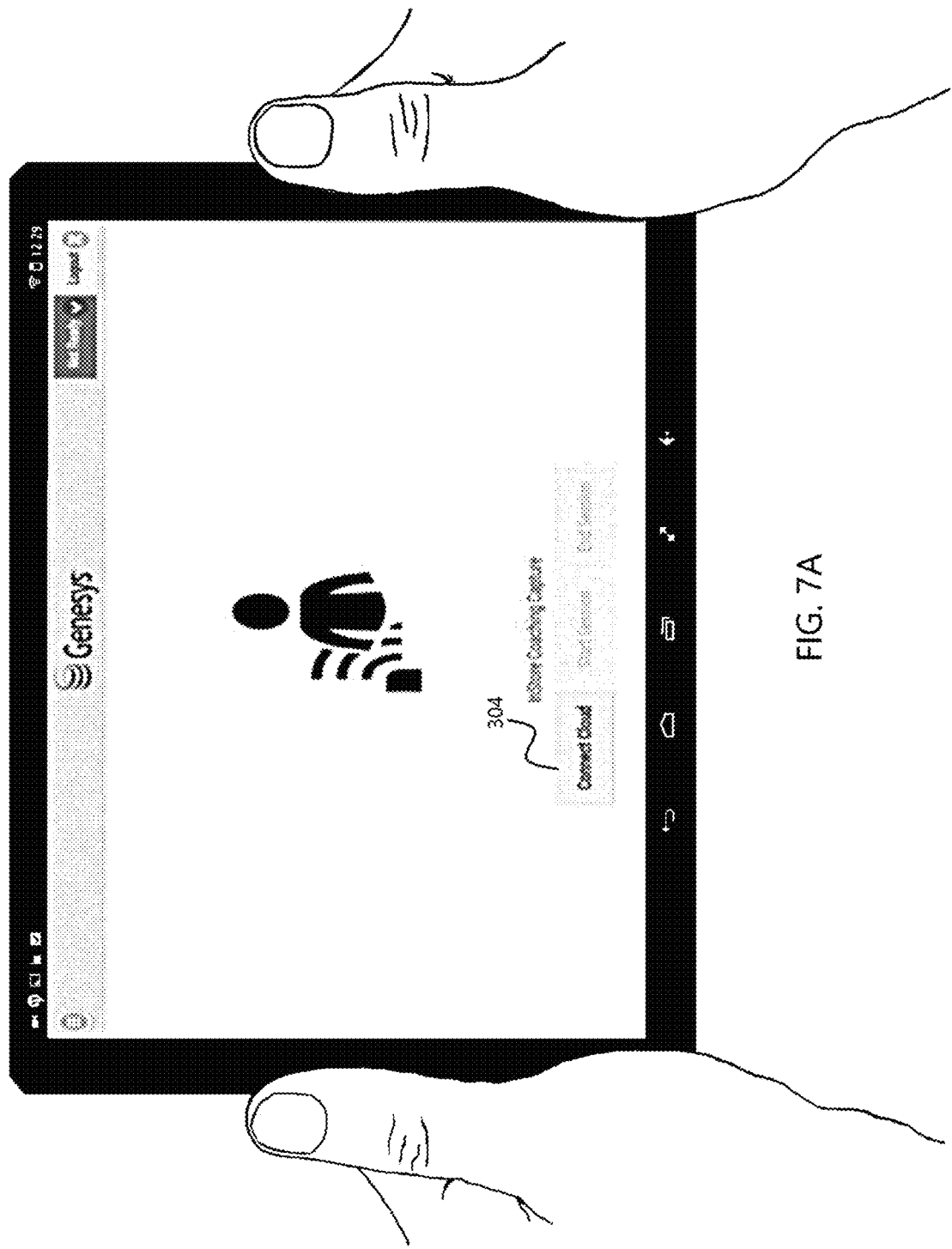
FIGS. 7A-7D are screen shots of the GUI displayed in response to a user selection of a coaching option according to one embodiment of the invention.
Figure 7B:
Figure 7C:
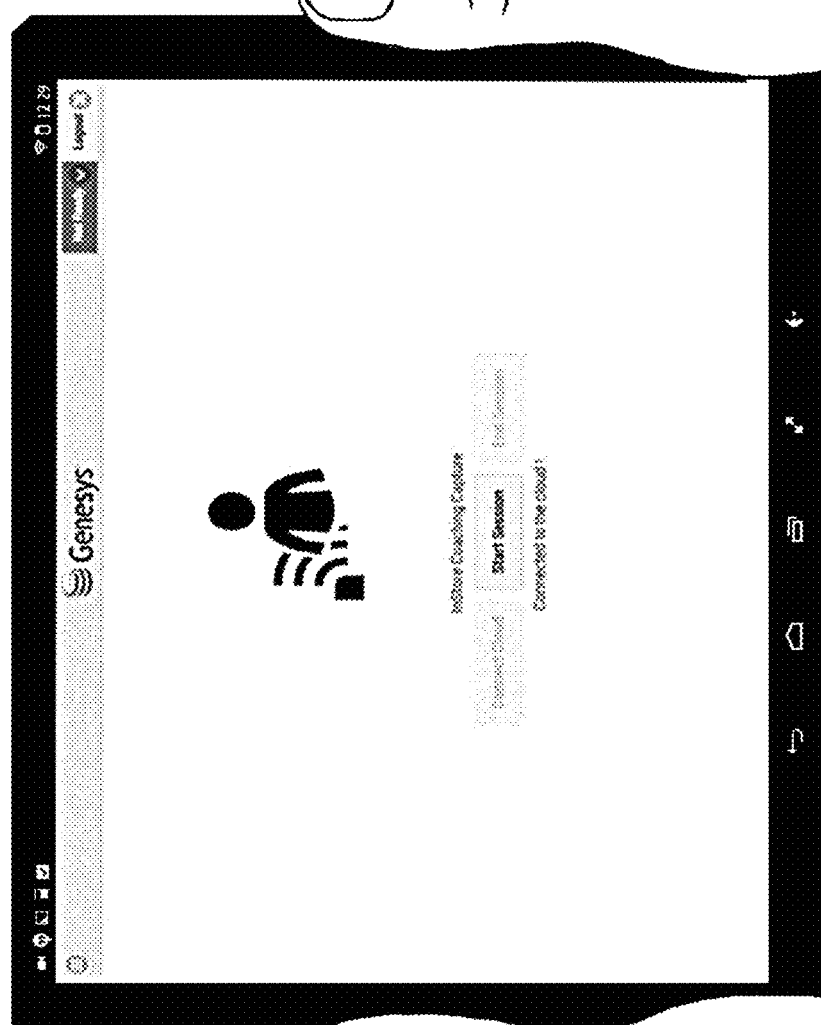
Figure 7D:

In response to the request to make the connection, the SIP server transmits a request to the retail application for permission to enable the device's camera and/or microphone, as is depicted via FIG. 7B. Transmitting of an "allow" signal back to the SIP server creates a connection between the SIP server/media server 18, and the end user device. The communication between the store representative and the manager may then be recorded by the media server 18 according to conventional mechanisms. According to one embodiment, the recording is stored in the storage device 24 of the contact center system, cloud storage device, and/or storage device coupled to the hub server 100. The recording may also be stored locally on the end user device, and transmitted to the hub server 100 directly by the end user device.

According to one embodiment, the recording is transmitted to the hub server 100 as CX data for analysis, including real-time analysis, by the analytics module 204. For example, the recording may be analyzed for determining the quality of coaching. In this regard, the analytics module 204 may include a speech recognition algorithm for recognizing key words or phrases during the coaching. The speech recognition algorithm may utilize phrase recognition as described in U.S. Pat. No. 7,487,094, entitled "System and method of call classification with context modeling based on composite words," the content of which is incorporated herein by reference.

According to one embodiment, the analyzed coaching session may be compared against other coaching sessions in the same and/or other retail stores, for making a recommendation in response. For example, the recommendation may be a modified coaching script generated in real-time and displayed via the retail application. Further coaching and training may also be recommended by the analytics server and pushed for display on the store representative and/or manager that needs help.

Figure 8:
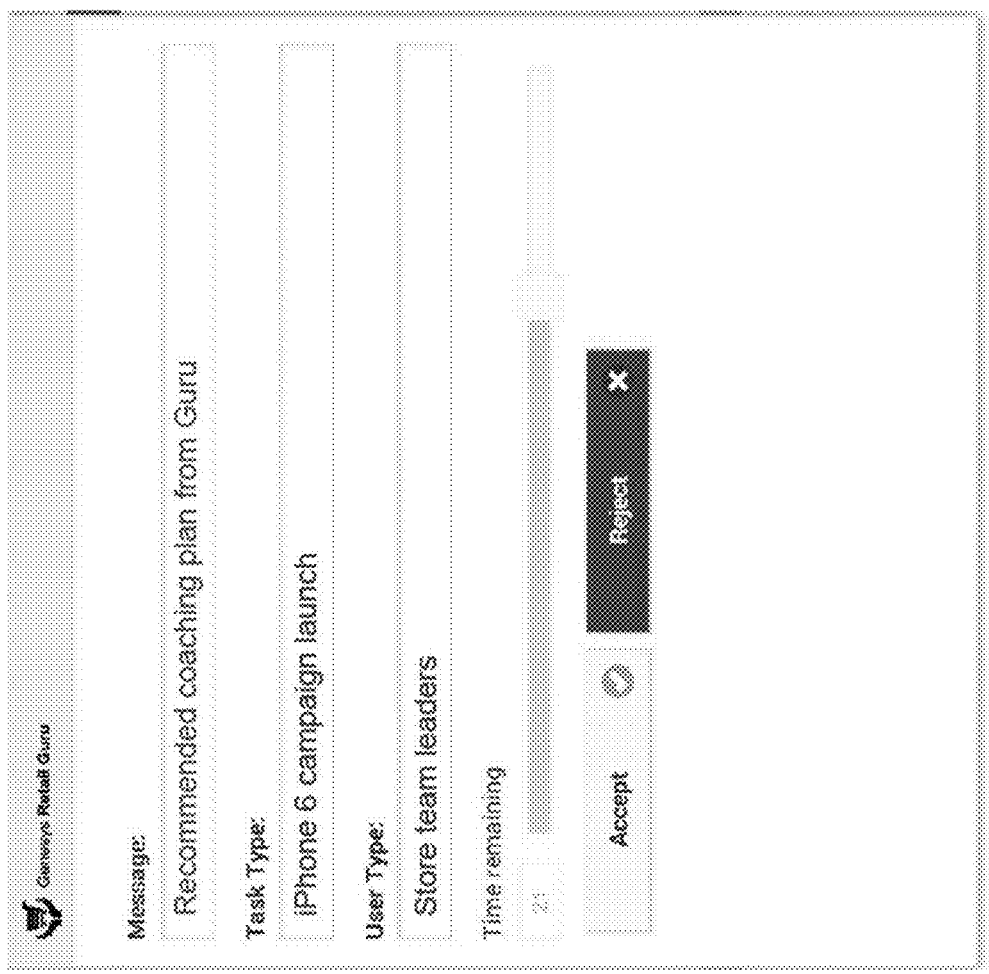
FIG. 8 is a screen shot of a coaching plan recommended and pushed to a store team leader according to one embodiment of the invention.

FIG. 8 is a screen shot of a coaching plan recommended and pushed to a store team leader according to one embodiment of the invention.

According to one embodiment, instead of recording a conversation between a store representative and a manager, the recording may be between the store representative and a customer visiting the retail store. Such recordings are also provided to the analytic s module 204 for storage and analysis. For example, the recording may be analyzed in real-time by the analytics server for making a recommendation. The analysis may detect based on particular uttered words of the customer, that the customer is interested in particular products or services, the customer has particular concerns, the customer is unhappy, and/or the like. In response to the analysis, the analytics module may recommend, for example, a product or service to be offered to the customer (e.g. upon detecting interest in a related product). The recommendation may also be, for example, that the interaction in the store be transferred from the current store representative to another store representative with skills more suitable to handle a request from the customer. The recommendation may further be escalation of the interaction to a supervisor. According to one embodiment, the recommendation is displayed to the current store representative via the retail application.

In another example, the recording may be analyzed to link the interaction at the retail store, with the interaction at the contact center. Such linking may be possible, for example, upon performing analytics of the conversation between the customer and the representative where specific agent names, order numbers, interaction dates, and/or the like, are uttered. Of course, the customer may also provide identification of such information to a greeter at the retail store who manually enters the information via the retail application, scans a code containing the information, and/or the like. The retail application may further be used to store interaction results at the store including, for example, any sales that occurred, survey results, and the like. Such interaction data is transmitted as CX data to the hub server 100 for aggregation and analysis. The interaction data may also be transmitted to the contact center system associated with the retail store for storing in, for example, an interaction database.

Knowing who the customer who walked into the retail store is, and further, identifying relevant interactions at the contact center allows correlation of interactions occurring in both the retail store and the contact center for providing a full view of the customer's experience as the customer transitions from one medium to another. That is, tracing interactions and associated customer experience need not end at the contact center, but may be carried over and correlated to interactions and associated customer experiences in the retail store, and vice versa, and stored, for example, in the mass data storage device 24 of the associated contact center system. The combining of CX data provided by the retail store along with data provided by the contact center allows a single view of interactions across retail store and contact center for quality control, cause/effect analysis, performance evaluations, and the like.

The ability to link a conversation occurring in the store with a specific interaction and agent at the contact center also allows different types of analysis, including for example, analysis of representations being made by specific agents, identification of agents generating complaints, and the like. Training items may be recommended by the analytics module 204 for staff at the contact center and/or retail store in response to such analysis. Real-time analytics of conversations at the retail store may also allow, for example, real-time coaching of store representatives, escalation to supervisors, and the like.

According to one embodiment, the retail application may be configured to capture information on the customer visiting the retail store, and further capture interaction data in the retail store, for transmitting to the hub server 100 and/or mass storage device 24 of the associated contact center system 120. According to one embodiment, the interaction data in the retail store is stored in correlation with other interactions of the customer, such as, for example, interactions of the customer with contact center agents of the associated contact center.

Figure 9A:
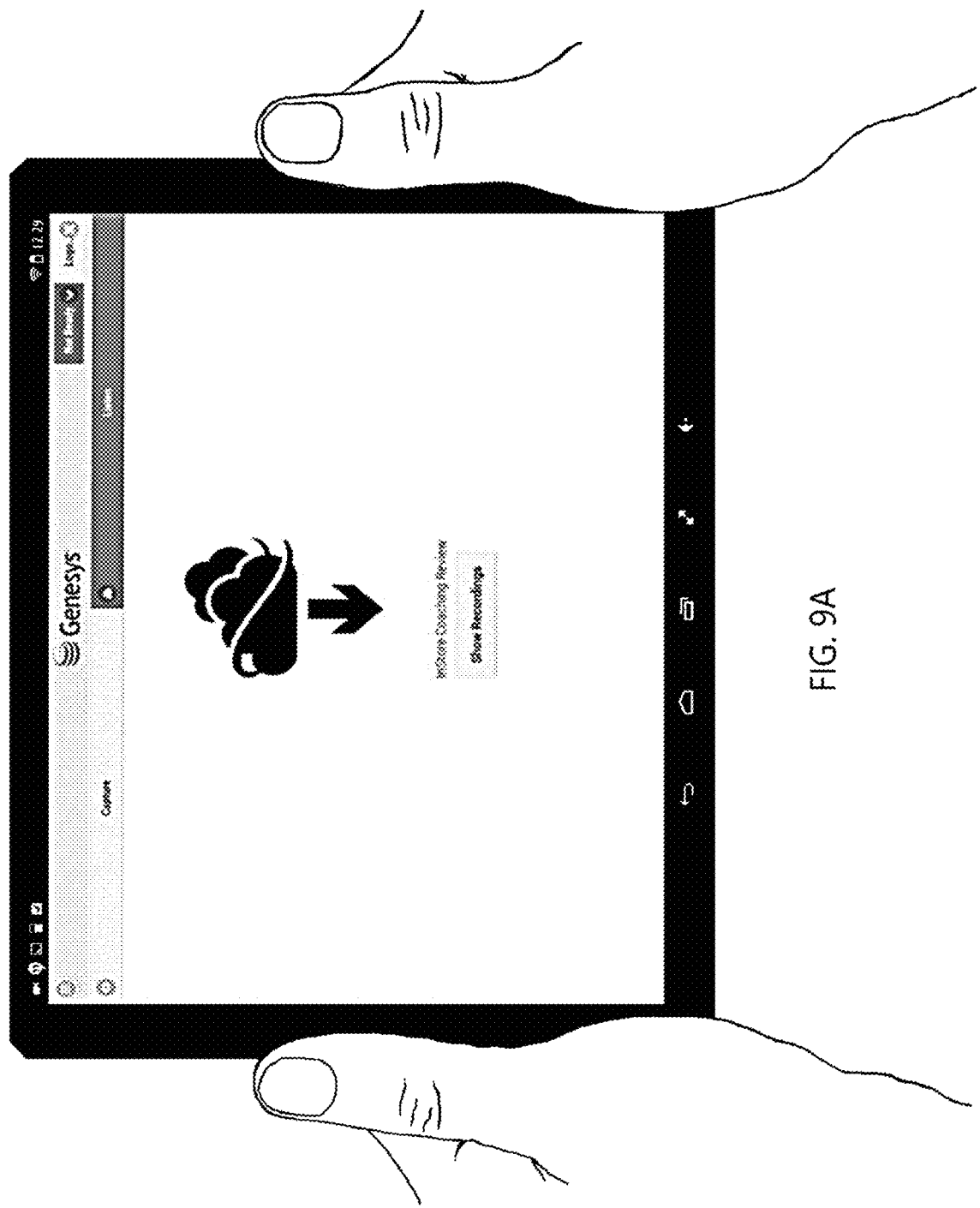
FIGS. 9A-9B are exemplary screen shots of the GUI displayed by the retail application for replay of recorded conversations according to one embodiment of the invention.
Figure 9B:
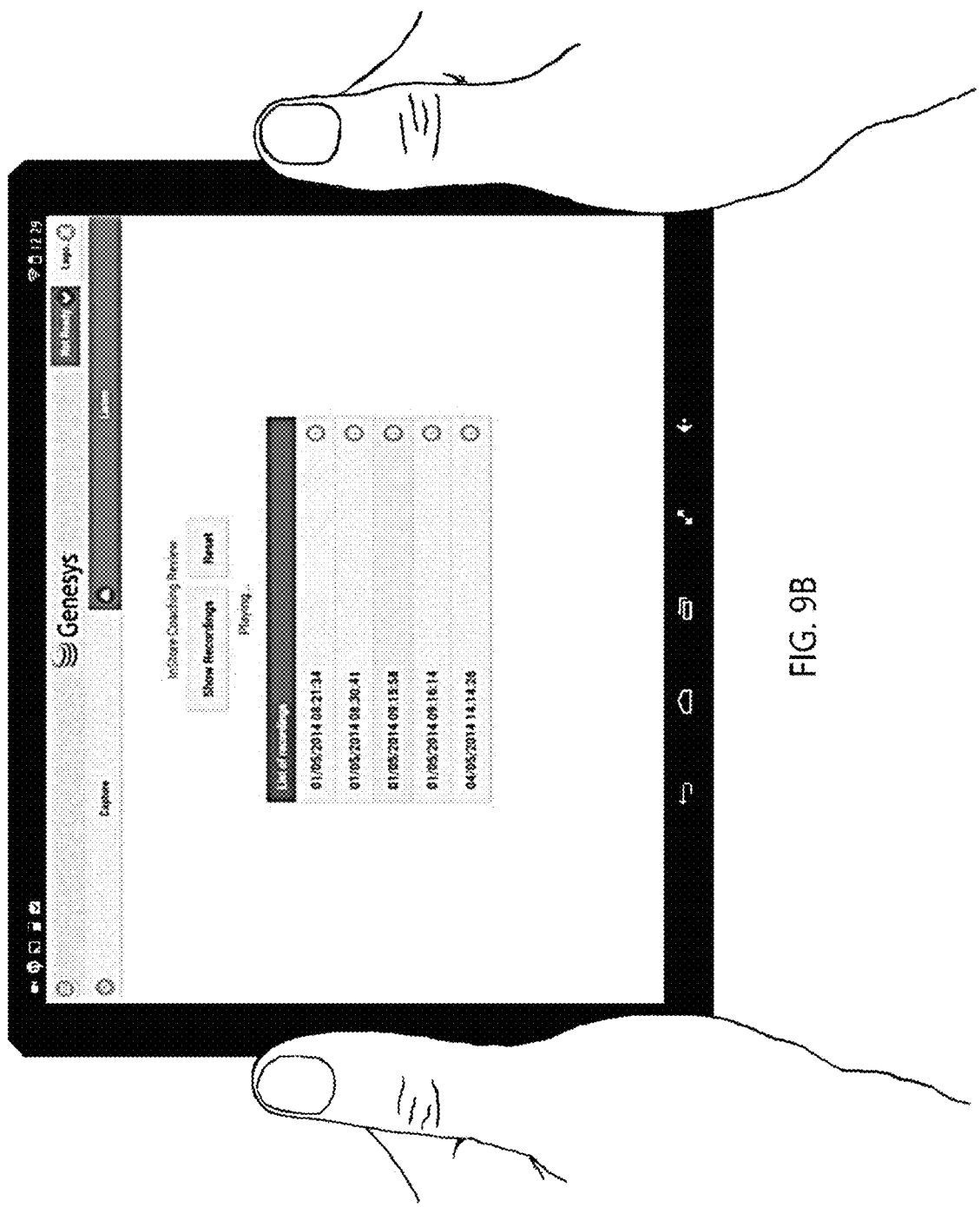

FIGS. 9A-9B are exemplary screen shots of the GUI displayed by the retail application for replay of recorded conversations according to one embodiment of the invention. For example, recordings between the store representative and a customer may be replayed by a store manager for coaching purposes.

According to one embodiment, CX data accumulated from the retail stores along with data generated by the contact centers across different tenants is aggregated by the hub server 10. As discussed above, the analytics module 204 at the hub server generates statistics that are accessible via one or more CX objects in real time. According to one embodiment, real-time analytics of the CX data allows recommendations to be made in real-time to the retail stores via the retail applications for optimizing performance at the retail stores. For example, information collected over various retail stores as to upsell results for various products or services, allows the analytics module to dynamically change upsell recommendations for other retail stores. In addition, the routing server 14 at the contact center may identify the store representatives with the most appropriate skills to interact with the customer and handle the upsell. According to one embodiment, the prediction trees discussed above may be used to simulate how changes of various products or services that are offered together affect KPIs such as, for example, sales at the retail stores. A task may be routed to the identified store representative to do the upsell.

Figure 10:
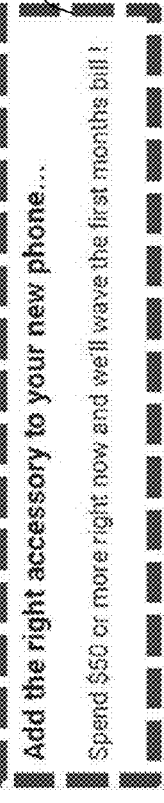
FIG. 10 is an exemplary screen shot of a GUI displayed by the retail application for recommending an upsell item to a customer based on analysis performed by the analytics module according to one embodiment of the invention.

FIG. 10 is an exemplary screen shot of a GUI displayed by the retail application for recommending an upsell item to a customer based on analysis performed by the analytics module according to one embodiment of the invention. The upsell script and/or item 350a-d may be dynamically modified and pushed to the retail application in real time. For example, in response to the analytics module identifying popular upsell items across different retail stores, the analytics module may modify existing upsell items with the identified popular items for display by the retail application.

Bridging Online Customer Experience

In addition to aggregating CX data from retail stores, data of customer interactions in other mediums, such as, for example, virtual media, may also be aggregated and associated with a particular customer. The virtual medium may be, for example, the Internet, and the interaction in the virtual medium may be, for example, anonymous browsing of a company's website. The customer may browse the company's website to get information on different products and/or services offered by the company, without logging on or otherwise identifying himself to the website. Thus, the customer may be anonymous to the website.

According to one embodiment, the anonymous online journey experience is gathered by the server hub 100, and stored in a database such as, for example, an unstructured database. The data that is stored may be, for example, all or portion of the user's interactions on the web page. The data may be stored as part of CX data, or separately from the CX data until, for example, the anonymous online journey is no longer anonymous. Although interactions with a web page is used as an example, a person of skill in the art should recognize that other interactions in other virtual mediums may also be monitored, such as, for example, users' interactions with phone applications, smart TVs, and/or the like.

The online interaction data that is collected and stored may depend on rules accessed by the analytics module. For example, not all web browsing data may be stored. Instead, significant/trigger events such as a user adding a product into a shopping cart, pop-up ads displayed to the user on the website, user selecting a pop-up ad, and the like, may be collected as customer anonymous journey data, and stored in the database in association with a code.

According to one embodiment, the anonymous online journey may be analyzed for providing, for example, offers to the customer. For example, a coupon may be offered to the customer for selecting a particular link on the website, visiting a particular webpage, making a particular purchase, and the like. In one specific example, a 50% discount coupon that is to be used at a retail store, may be offered for phone accessories, in response to the customer's online purchase of a certain number of phones. The offered coupon may include the code that is stored in association with the online journey.

The code may also be provided to the customer according to other mechanisms, such as, for example, a rewards card, bar code (e.g. a matrix barcode also known as QR code), phone number and/or the like. The code may be provided to the user on a web page during the web browsing experience. The code may also be provided via any other communication mechanism conventional in the art, such as, for example, text message, email, tweet, social media message, and/or printed mail.

According to one embodiment, the code provided to the user is used to retrieve the stored anonymous journey data to bridge the user's virtual experience with the user's experience in another medium, such as, for example, an offline retail store, contact center, and/or the like. For example, the customer may take the coupon containing the code to the physical retail store, and redeem it to obtain a discount on products sold at the store. According to one embodiment, the code is captured by the retail application upon scanning, manual entry, and/or the like. According to one embodiment, the retail application submits the retrieved code to the contact center system 120 and/or hub server 100 to obtain the anonymous journey data stored in association with the code. When such data is retrieved, the customer generating the journey data transitions from being anonymous to being identified. The retrieved journey data is displayed by the retail application in relation to a timeline, and may be used by a store representative to dynamically treat the customer based on context of the customer journey. According to one embodiment, the journey data may be used to select an appropriate store representative based on an understanding/prediction of needs of the customer from the journey data. Communications from the customer to the contact center may also be routed to an appropriate agent based on the customer's journey data.

Figure 11:
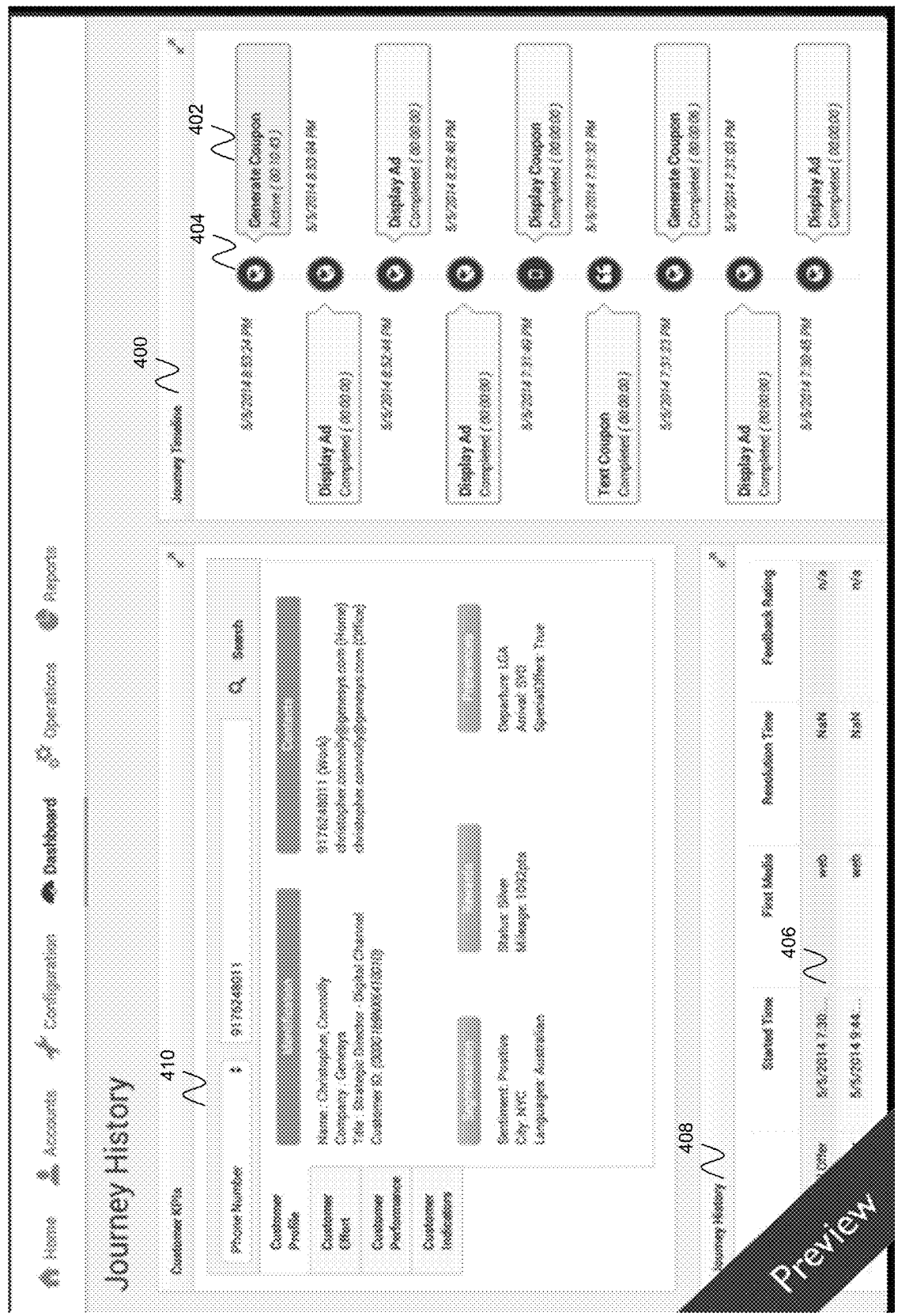
FIG. 11 is a screen shot of an identified customer's journey history according to one embodiment of the invention.

FIG. 11 is a screen shot of an identified customer's journey history according to one embodiment of the invention. One or more journeys 406 stored for the customer is displayed in a journey history area 408. Each journey may be identified by a name, time, type of initial media, resolution, time, feedback rating, and/or the like. Selection of a particular journey 406 in the journey history area 408 causes display of a journey timeline 400 identifying, in chronological order, relevant events/interactions 402 taken by the customer across different mediums, including anonymous online interactions. Particular icons 404 may be displayed next to the interactions/events to identify the medium in which the interaction/event occurred.

According to one embodiment, the identified customer becomes verified upon the customer providing personal data about the customer, such as, for example, the customer's name, address, phone number, email address, and/or the like. Information about the verified customer may be displayed in a customer information area 410. Such information may include customer profile information retrieved from the contact center system 120. Once the customer is verified, the customer's anonymous online journey may be stored and linked to the customer's profile. The linking to the specific customer profile allows the customer's online journey to be linked to other interactions taken by the customer, including interactions with the contact center, the retail store, and the like.

Figure 12:
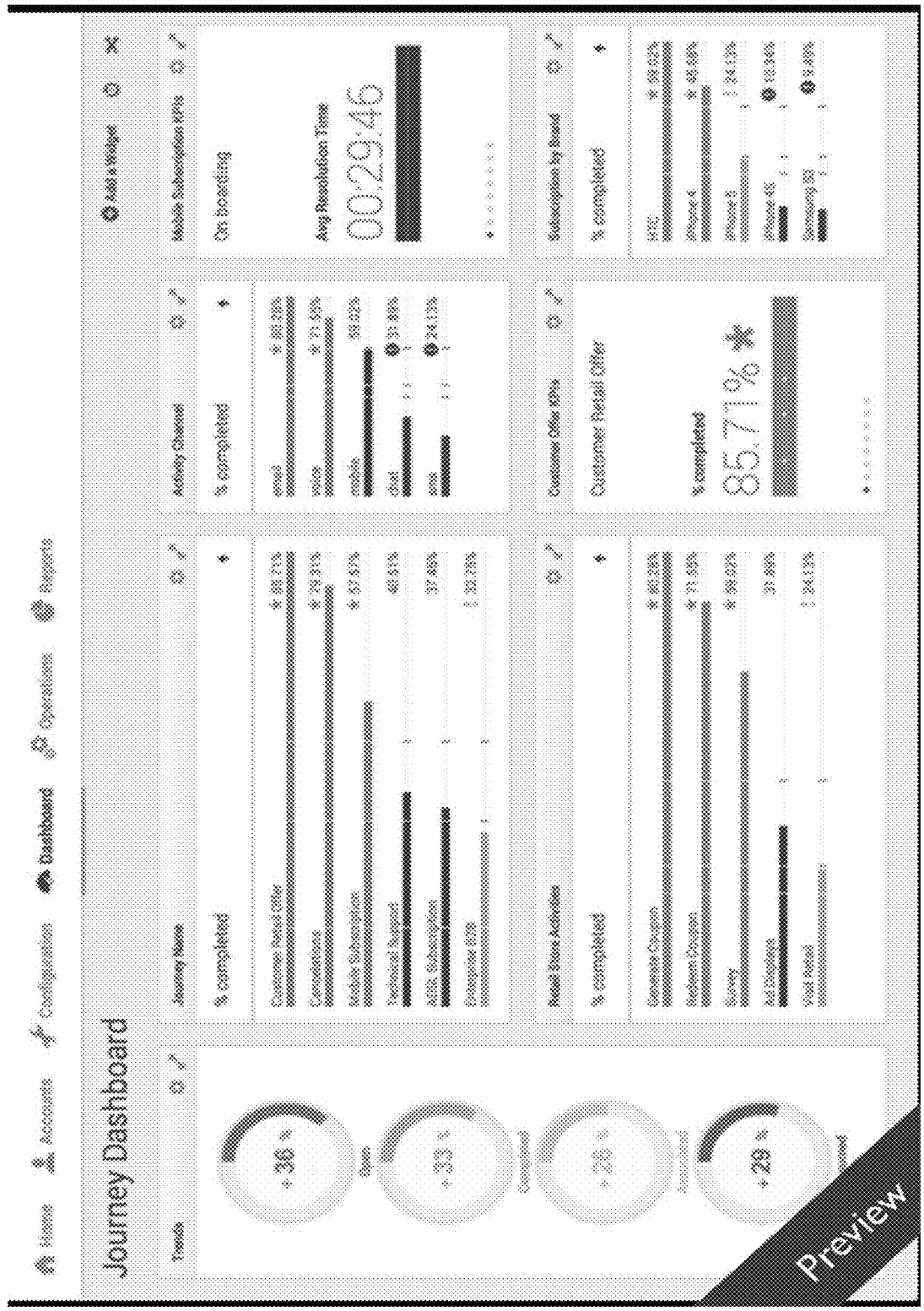
FIG. 12 is a screen shot of a journey dashboard according to one embodiment of the invention.

FIG. 12 is a screen shot of a journey dashboard according to one embodiment of the invention. The journey dashboard provides journey data aggregated across multiple journeys of the same customer or different customers. The dashboard provides data for identifying common journeys, common paths, and the like. The aggregated journey data may be provided to the hub server 100 for analysis and recommendation.

Figure 13:
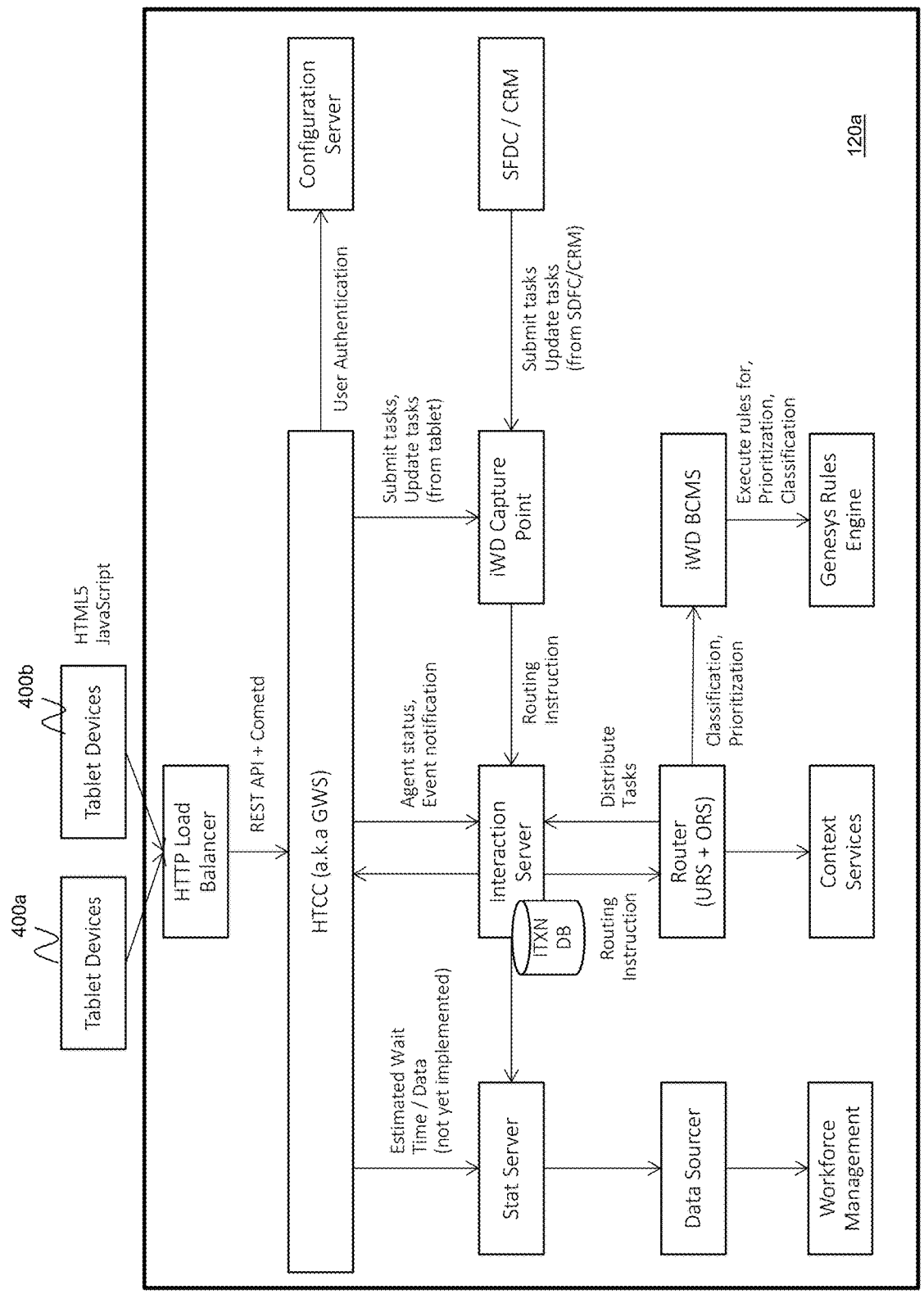
FIG. 13 is a schematic block diagram of an embodiment of a contact center system configured to interact with end user devices hosting a retail application according to one embodiment of the invention.

FIG. 13 is a schematic block diagram of an embodiment of the contact center system 120a configured to interact with end user devices 400a, 400b hosting the retail application according to one embodiment of the invention. The contact center system 120a of FIG. 13 may be similar to the contact center system 120 of FIG. 3.

Each of the various servers, controllers, switches, gateways, engines, and/or modules (collectively referred to as servers) in the afore-described figures may be a process or thread, running on one or more processors, in one or more computing devices 1500 (e.g., FIG. 14A, FIG. 14B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 14A:
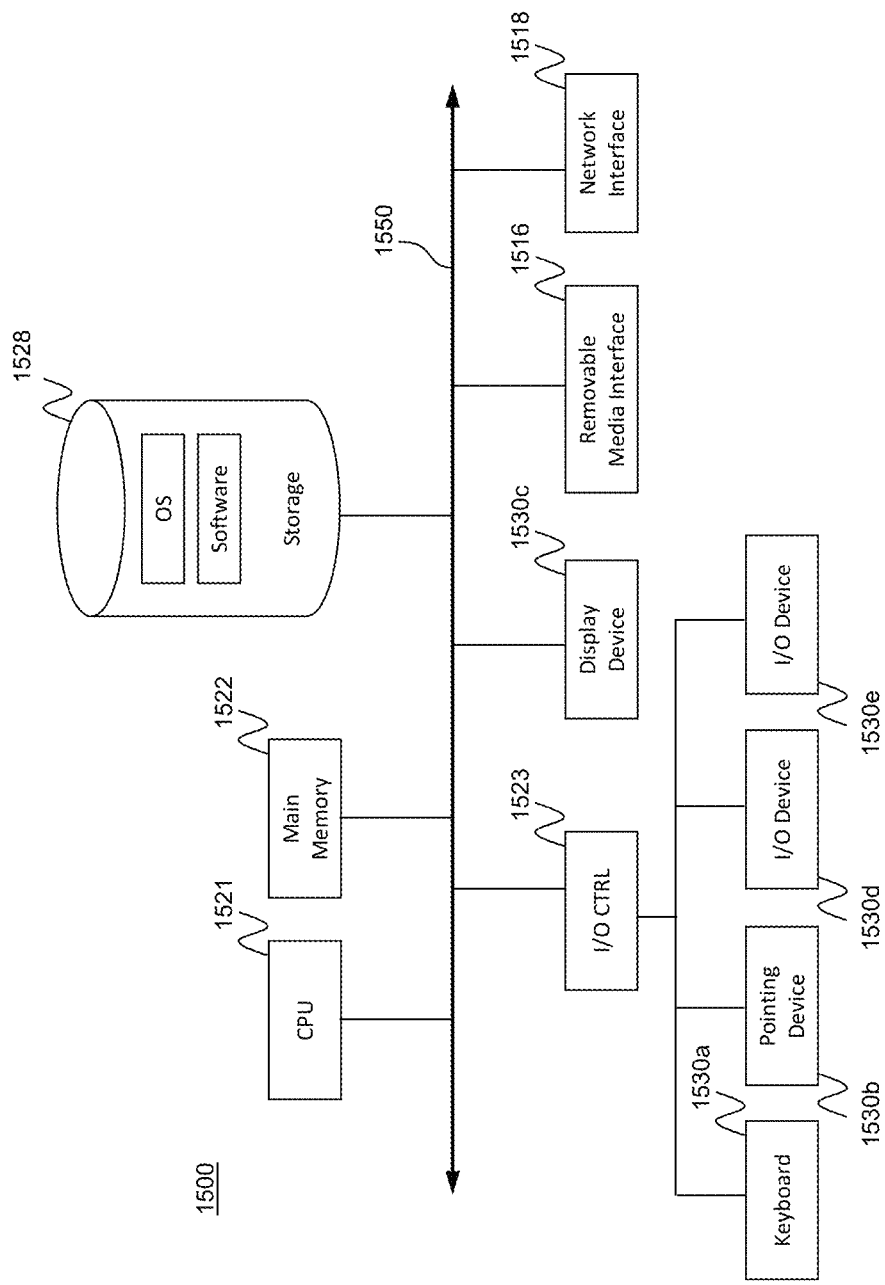
FIG. 14A is a block diagram of a computing device according to an embodiment of the present invention.
Figure 14B:
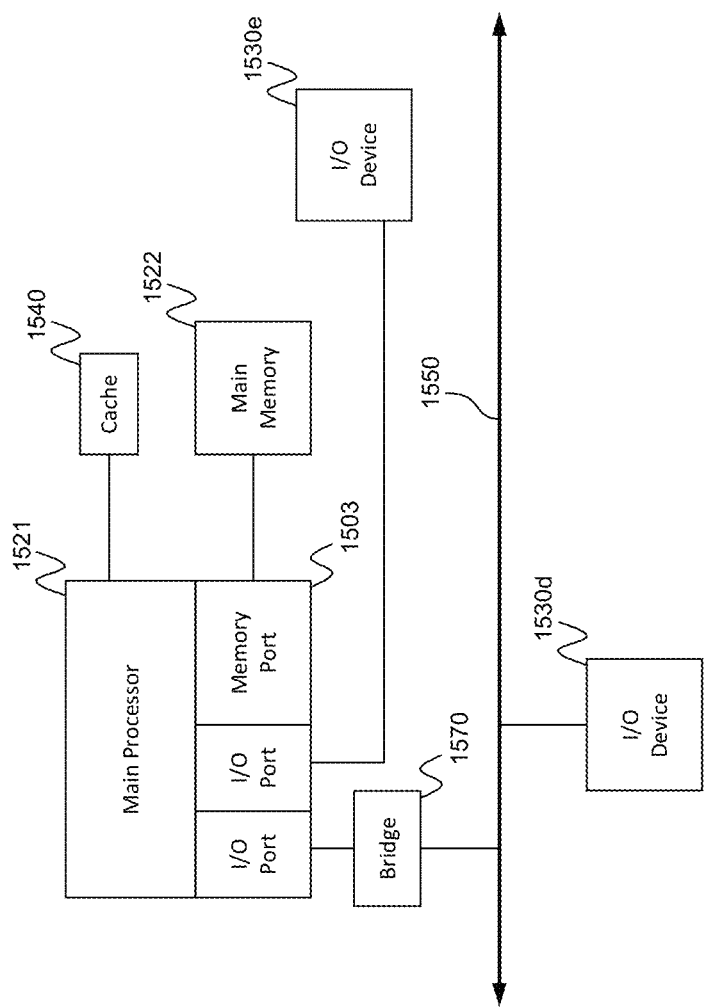
FIG. 14B is a block diagram of a computing device according to an embodiment of the present invention.

FIG. 14A and FIG. 14B depict block diagrams of a computing device 1500 as may be employed in exemplary embodiments of the present invention. Each computing device 1500 includes a central processing unit 1521 and a main memory unit 1522. As shown in FIG. 14A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 14B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 14A, the central processing unit 1521 communicates with the main memory 1522 via a system bus 1550. As shown in FIG. 14B, the central processing unit 1521 may also communicate directly with the main memory 1522 via a memory port 1503.

FIG. 14B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 14A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 14B depicts an embodiment of a computer 1500 in which the central processing unit 1521 communicates directly with I/O device 1530e. FIG. 14B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 14A, may control the I/O devices. The I/O controller may control one or more I/O devices such as a keyboard 1530a and a pointing device 1530b, e.g., a mouse or optical pen.

Referring again to FIG. 14A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 14A and FIG. 14B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figures 14C, 14D:
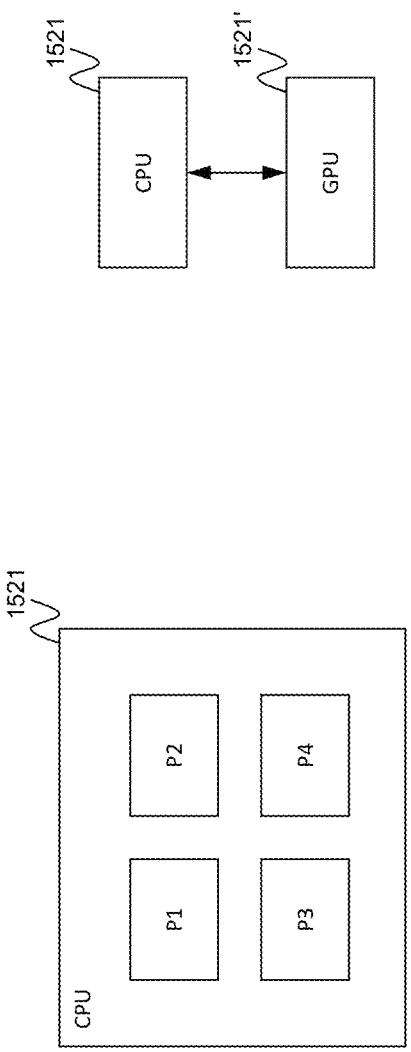
FIG. 14C is a block diagram of a computing device according to an embodiment of the present invention.
FIG. 14D is a block diagram of a computing device according to an embodiment of the present invention.

As shown in FIG. 14C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 14D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 14E:
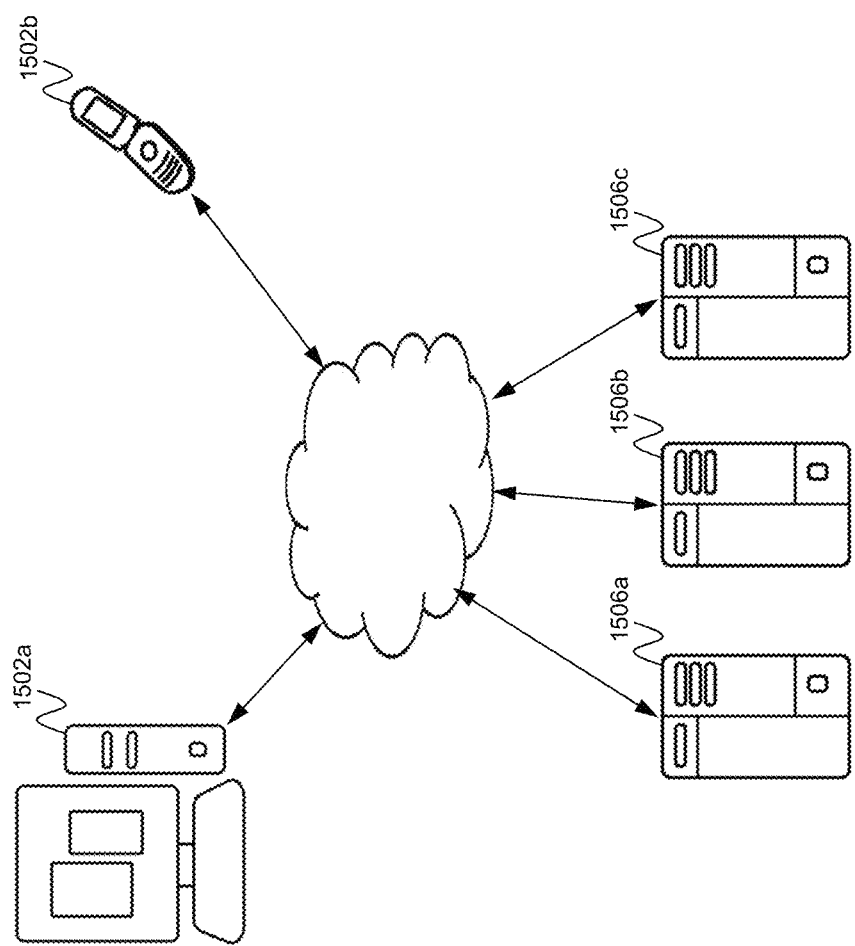
FIG. 14E is a block diagram of a network environment including several computing devices according to an embodiment of the present invention.

A computing device may be one of a plurality of machines connected by a network, or it may comprise a plurality of machines so connected. FIG. 14E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 14E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 14E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

It is the Applicant's intention to cover by claims all such uses of the invention and those changes and modifications which could be made to the embodiments of the invention herein chosen for the purpose of disclosure without departing from the spirit and scope of the invention. The particular manner in which template details are presented to the user may also differ. Thus, the present embodiments of the invention should be considered in all respects as illustrative and not restrictive, the scope of the invention to be indicated by claims and their equivalents rather than the foregoing description.

The invention claimed is:

1. A multi-tenant analytics system comprising:
a data store, for storing event data in correlation with customer experience data related to respective customers collected by one or more objects stored in the data store;
a scanner disposed at a plurality of physical retail stores configured to scan and transmit one or more identifiers for identifying the customers;
a processor coupled to the data store; and
a memory, wherein the memory stores therein instructions that, when executed by the processor, cause the processor to:
collect from the one or more objects over a data communication network, real-time metrics data for the plurality of physical retail stores associated with a plurality of respective contact centers, wherein the real-time metrics data includes:
interaction data collected from interactions between customers and respective websites associated with the plurality of physical retail stores; and
information on sales of products or services by the plurality of physical retail stores;
store the collected real-time metrics data in the data store;
dynamically generate, by an analytics module, benchmark data based on the collected real-time metrics data and determine a performance of a particular retail store of the plurality of physical retail stores in relation to the benchmark data;
perform, by the analytic module, real-time analytics using the collected metrics data to identify a product or service;
generating, by the analytics module, one or more prediction trees that correlate the collected metrics data and key performance indicators used to calculate the benchmark data;
modify, by the analytics module using the one or more prediction trees, a prior service or product to be offered by the particular retail store with the identified service or product, wherein the modifying is based on the one or more prediction trees optimizing one or more of the key performance indicators for the particular retail store; and
push the modified service or product via a display on an electronic device at the particular retail store;
wherein the display on the electronic device comprises a modified upsell script relating to the modified service or product;
wherein a particular customer of the customers is identified in response to the particular customer visiting the particular retail store by the scanner disposed at the particular retail store, wherein the instructions further cause the processor to:
receive the scanned one or more identifiers transmitted by the scanner;
associate the stored interaction data to the particular customer based on the one or more identifiers;
recommend offering the modified service or product to the particular customer instead of the identified service or product based on the associating of the stored interaction data of the particular customer with an interest in at least one of the modified service or product and the identified service or product;
capture current interaction data related to the particular customer's visit to the particular retail store and the recommended offering of the modified service or product to the particular customer;
update, by the analytics model, the one or more prediction trees based on the collected real-time metrics data, the captured current interaction data, and the recommended offering of the modified service or product to the particular customer; and
dynamically generate, by the analytics module, updated benchmark data based on the collected real-time metrics data, the captured current interaction data, and the one or more updated prediction trees, the updated benchmark data then being used to determine a performance of another retail store of the plurality of physical retail stores in relation to the updated benchmark data for identifying another product or service by which to modify a prior product or service associated thereto.

2. The system of claim 1, wherein the electronic device is configured to host an application invoked by a store representative in the particular retail store.

3. The system of claim 1, wherein the real-time metrics data includes at least one of interaction data from interactions at the plurality of physical retail stores, customer satisfaction data, sales data, and retail store workforce data.

4. The system of claim 1, wherein the modified product or service comprises an upsell or cross-sell product or service in relation to the identified product or service.

5. The system of claim 1,
wherein the instructions further cause the processor to identify a particular store representative for performing an interaction with the particular customer.

* * * * *